(12) United States Patent
Sueda et al.

(10) Patent No.: US 8,399,092 B2
(45) Date of Patent: Mar. 19, 2013

(54) ZINC OXIDE PARTICLE HAVING HIGH BULK DENSITY, METHOD FOR PRODUCING IT, EXOERGIC FILLER, EXOERGIC RESIN COMPOSITION, EXOERGIC GREASE AND EXOERGIC COATING COMPOSITION

(75) Inventors: Satoru Sueda, Fukushima (JP); Atsuki Terabe, Fukushima (JP); Hiroyuki Izumikawa, Fukushima (JP); Mitsuo Hashimoto, Fukushima (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 12/767,183

(22) Filed: Apr. 26, 2010

(65) Prior Publication Data

US 2011/0081550 A1 Apr. 7, 2011
US 2011/0244236 A2 Oct. 6, 2011

Related U.S. Application Data

(63) Continuation-in-part of application No. 12/579,925, filed on Oct. 15, 2009.

(30) Foreign Application Priority Data

Oct. 7, 2009 (JP) ................................ 2009-233401
Oct. 14, 2009 (JP) ................................ 2009-237305

(51) Int. Cl.
*C01G 9/02* (2006.01)
*B32B 5/16* (2006.01)

(52) U.S. Cl. .......... 428/402; 423/99; 423/266; 423/275; 423/622

(58) Field of Classification Search .................... 423/99, 423/266, 275, 622; 428/402
See application file for complete search history.

(56) References Cited

U.S. PATENT DOCUMENTS

| | | | | |
|---|---|---|---|---|
| 4,142,124 | A | * | 2/1979 | Ogawa et al. ................. 310/360 |
| 4,285,839 | A | | 8/1981 | Wong |
| 4,303,702 | A | * | 12/1981 | Bullock et al. ................ 427/220 |
| 4,981,624 | A | | 1/1991 | Tsuda et al. |
| 5,073,302 | A | * | 12/1991 | Igari et al. ................ 252/519.51 |
| 5,876,688 | A | * | 3/1999 | Laundon ........................ 423/622 |
| 5,891,237 | A | * | 4/1999 | Kinniard ....................... 106/505 |
| 6,184,771 | B1 | * | 2/2001 | Suzuki et al. .................... 338/21 |
| 6,469,611 | B1 | | 10/2002 | Kluge-Weiss et al. |

(Continued)

FOREIGN PATENT DOCUMENTS

CN 101627448 1/2010
DE 3830597 A1 3/1989

(Continued)

OTHER PUBLICATIONS

Puyane et al., High performance varistor discs obtained from chemically synthesized doped zinc oxide powder, J. of Sol-Gel Sci. and Tech. 13, 575-578 (1998).*

(Continued)

*Primary Examiner* — Hoa (Holly) Le
(74) *Attorney, Agent, or Firm* — Novak Druce Connolly Bove + Quigg LLP

(57) ABSTRACT

A zinc oxide particle having large particle diameter and being high-density is provided. An exoergic resin composition, an exoergic grease and an exoergic coating composition containing the zinc oxide particle exhibit an excellent exoergic property. The zinc oxide particle being high-density, has a density of 4.0 g/cm³ or more, median size (D50) of 17 to 10000 μm and tap bulk density of 3.10 g/cm³ or more.

22 Claims, 15 Drawing Sheets

U.S. PATENT DOCUMENTS

| | | | |
|---|---|---|---|
| 2002/0121960 A1* | 9/2002 | Ando et al. | 338/21 |
| 2003/0008961 A1 | 1/2003 | Uematsu | |
| 2007/0040304 A1* | 2/2007 | Bell et al. | 264/331.11 |
| 2007/0293624 A1 | 12/2007 | Matsumoto et al. | |
| 2009/0025508 A1 | 1/2009 | Liao et al. | |
| 2010/0136337 A1* | 6/2010 | Ando et al. | 428/402 |
| 2011/0081548 A1* | 4/2011 | Sueda et al. | 428/402 |

FOREIGN PATENT DOCUMENTS

| | | |
|---|---|---|
| DE | 19824104 A1 | 10/1999 |
| DE | 102007050835 | 1/2009 |
| EP | 2124233 | 11/2009 |
| JP | 8-310318 A | 11/1996 |
| JP | H-8-310813 | 11/1996 |
| JP | 09-501139 | 2/1997 |
| JP | 11-049516 | 2/1999 |
| JP | H-11-49516 | 2/1999 |
| JP | H-11-246885 | 9/1999 |
| JP | 2002-201483 | 7/2002 |
| JP | 2003-012925 | 1/2003 |
| JP | 2004-142999 | 5/2004 |
| JP | 2007-070492 | 3/2007 |
| JP | 2007-84704 | 4/2007 |
| JP | 2008-019426 | 1/2008 |
| JP | 2008-218749 | 9/2008 |
| JP | 2008-254990 | 10/2008 |
| JP | 2009-029690 | 2/2009 |
| JP | 2009-249226 | 10/2009 |
| JP | 2009-249226 A | 10/2009 |
| JP | 2010-208881 | 9/2010 |
| WO | WO-95/04704 | 2/1995 |
| WO | WO-2008/120444 | 10/2008 |

OTHER PUBLICATIONS

Perez-Lopez et al., The catalytic behavior of zinc oxide prepared from various precursors and by different methods, Mat. Research Bulletin 40, 2089-2099 (2005).*

Peigney et al., Influence of chemical composition on sintering of bismuth-titanium-doped zinc oxide, J. of Mater. Sci., vol. 27, Issue 9, May 1992, pp. 2397-2405, abstract only.*

Written Opinion of The International Searching Authority and International Search Report dated Jan. 11, 2011 in PCT/JP2010/066650.

Supplementary European Search Report dated Apr. 12, 2012 issued in European Application No. EP10821878.

* cited by examiner

ZINC OXIDE PARTICLE HAVING HIGH BULK DENSITY, METHOD FOR PRODUCING IT, EXOERGIC FILLER, EXOERGIC RESIN COMPOSITION, EXOERGIC GREASE AND EXOERGIC COATING COMPOSITION

TECHNICAL FIELD

The present disclosure relates to a zinc oxide particle having large particle diameter that can be used in the fields such as exoergic fillers, rubber accelerators, pigments for coating compositions and inks, such electronic components as ferrite and varistor, medicinal products and such cosmetics as foundations and sun screens, a method for producing it, an exoergic filler, an exoergic resin composition, an exoergic grease and an exoergic coating composition.

BACKGROUND OF THE DISCLOSURE

Zinc oxide is widely used in the various industrial fields such as rubber accelerators, pigments for coating compositions and inks, such electronic components as ferrite and varistor, medicinal products and cosmetics. As one of various applications of this zinc oxide, an exoergic filler has been proposed (see Patent Documents 1 to 4).

However, alumina and aluminum nitride are usually used widely as the exoergic filler. Therefore, the zinc oxide is put into actual utilization less than these fillers.

However, alumina has a problem that kneading machines become extremely worn in the production process of exoergic sheets and so on, because Mohs hardness of alumina is high. Further, it is difficult to add aluminum nitride to a resin in high concentration, because of poor filling property. In addition, aluminum nitride is expensive, so exoergic parts made thereof is expensive. Therefore, new exoergic fillers which are made of other materials than such conventional materials are needed.

Zinc oxide has almost intermediate thermal conductivity between alumina and aluminum nitride and is suitable for use as an exoergic filler. However, zinc oxide that is used widely for industrial use is a fine particle having a particle diameter of 1 µm or less and such zinc oxide is infrequently-used because interfacial area of the particle increases, leading to increase in thermal resistance between each particle and degradation in exoergic property. It is not preferred because the fine particle having a particle diameter of 1 µm or less has large surface area and the viscosity of a resin composition comprising the particle increases to make impossible for the fine particle to mix in high concentration. The particle diameter of zinc oxide is preferably larger because it can be expected that heat transfer route in the resin composition is increased as the particle diameter grow larger and improvement in heat transfer derived from closest-packing effect is attained by combination other filler. Further, it is preferred from a point of view of high heat transfer property to have less hole and high density.

Concerning zinc oxide particles having a median size (D50) of 20 to 120 µm, the one disclosed in Patent Document 5 for varistor is publicly known. When the zinc oxide particle is used as an exoergic filler, it is needed for the zinc oxide particle to have a large particle diameter and have high density of particle inside. However, the zinc oxide particle disclosed in Patent Document 5 has the following characteristics; (1) it shows an aggregate-like shape and has many unevenness and fine pores, so uniform particles can not be obtained; (2) the zinc oxide is designed to increase the number of primary crystal grains at the surface of the particle and inside thereof. For making the zinc oxide more suitable as the exoergic filler, it is preferred to clear the unevenness and fine pores at the surface of the particle and decrease the grains at the surface of the particle and inside thereof to be densified. Therefore, the zinc oxide particle disclosed in Patent Document 5 is not intended for the use as the exoergic filler. In addition, it is not preferred to use the zinc oxide particle as a material for an electronic device because the zinc oxide particle contains aluminum and insulation thereof tends to decrease. That is, a carrier carrying a charge of ZnO is a free electron and has the feature of N-type semiconductor. The conductivity would be improved by adding $Al^{3+}$ into ZnO, because it works as a donor providing a free electron to $Zn^{2+}$ and the number of the free electrons in ZnO increases.

As a spherical zinc oxide particle, the one that proposed for the field of functional materials such as varistor (Patent Document 5) and self-cleaning powder (Patent Document 6) which show ultraviolet absorption effect, catalyst effect, antibacterial effect or conductive effect is publicly known. However, it was hard to obtain a zinc oxide particle being spherical and high-density and having a median size (D50) of 17 to 10000 µm by using the above technology.

The method for producing a spherical zinc oxide particle having particle diameter of 1 to 50 µm by baking an organozinc compound has been proposed (Patent Document 7). A spherical particle could be obtained by using the technology, but it could not to obtain spherical particles selectively because konpeito-shaped particles were produced at the same time. The inventor of the present disclosure made an additional test and it found that the particle size distribution of the obtained particle was measured and the median size (D50) was several micrometer, so particles having median size (D50) of 10 µm or more could not obtained.

A zinc oxide being a zinc oxide particle doped by a monovalent dopant is disclosed in Patent Document 8. However, only the zinc oxide of which the outer circumference is doped by a metal is disclosed and a zinc oxide particle having specific shape and density is not disclosed.

In Patent Document 9, an oriented zinc oxide-type piezoelectric material containing at least one selected from the element group consisting of Ca, Mg, Ni and Cu in the composition is disclosed. However, a zinc oxide having particle shape is not disclosed in the Document.

PRIOR TECHNICAL DOCUMENT

Patent Document

[Patent Document 1] Japanese Kokai Publication 2008-19426
[Patent Document 2] Japanese Kokai Publication Hei11-246885
[Patent Document 3] Japanese Kokai Publication 2007-70492
[Patent Document 4] Japanese Kokai Publication 2002-201483
[Patent Document 5] Japanese Kokai Publication 2008-218749
[Patent Document 6] Japanese Kokai Publication 2009-29690
[Patent Document 7] Japanese Kokai Publication Hei11-49516
[Patent Document 8] Japanese Kokai Publication 2007-84704
[Patent Document 9] Japanese Kokai Publication Hei8-310813

SUMMARY OF INVENTION

Problem to be Solved by the Invention

The object of the present disclosure which has been in view of the above-mentioned state of the art, is to obtain zinc oxide particle having low hardness, superior exoergic and insulation properties, and large particle diameter and being high-density and to obtain an exoergic resin composition, an exoergic grease and an exoergic coating composition that show an excellent exoergic property by using it.

Means for Solving Object

The present disclosure relates to a zinc oxide particle being high-density, which has density of 4.0 g/cm$^3$ or more and median size (D50) of 17 to 10000 µm.

It is preferred that the zinc oxide particle has at least 85.0 weight % purity of zinc oxide and contains, as other metals, at least one metallic element selected from the group consisting of Mg, Ca, Ni, Co, Li, Na, K and Cu of less than 15.0 weight % as oxide relative to the weight of the zinc oxide particle.

It is preferred that the zinc oxide particle have the aspect ratio of 1.00 to 1.10.

Preferably, 90% or more particles of the particles have the aspect ratio of 1.10 or less.

The present disclosure relates to a method for producing a zinc oxide particle, comprising a step (1) of mixing a source of the zinc oxide particle with at least one compound selected from the group consisting of organic acids, organic bases, inorganic acids, inorganic bases, and salts thereof not containing a halogen to granulate, and a step (2) of baking the granulated particle obtained in said step (1) to obtain the zinc oxide particle, too.

The organic acid, organic base, inorganic acid, inorganic base, or salt thereof is preferably carboxylic acid, nitric acid or salts thereof.

The present disclosure relates to an exoergic filler comprising the zinc oxide particle.

The present disclosure relates to an exoergic resin composition comprising the zinc oxide particle.

The present disclosure relates to an exoergic grease comprising the zinc oxide particle.

The present disclosure relates to an exoergic coating composition comprising the zinc oxide particle.

Effect of the Invention

The zinc oxide particle of the present disclosure is large particle and high density, so it has high exoergic property and is used as the exoergic filler especially suitably. Therefore, it has become possible to obtain an exoergic resin composition, an exoergic grease, and exoergic coating composition that have an excellent exoergic property by using it.

EMBODIMENTS

Figure 1:
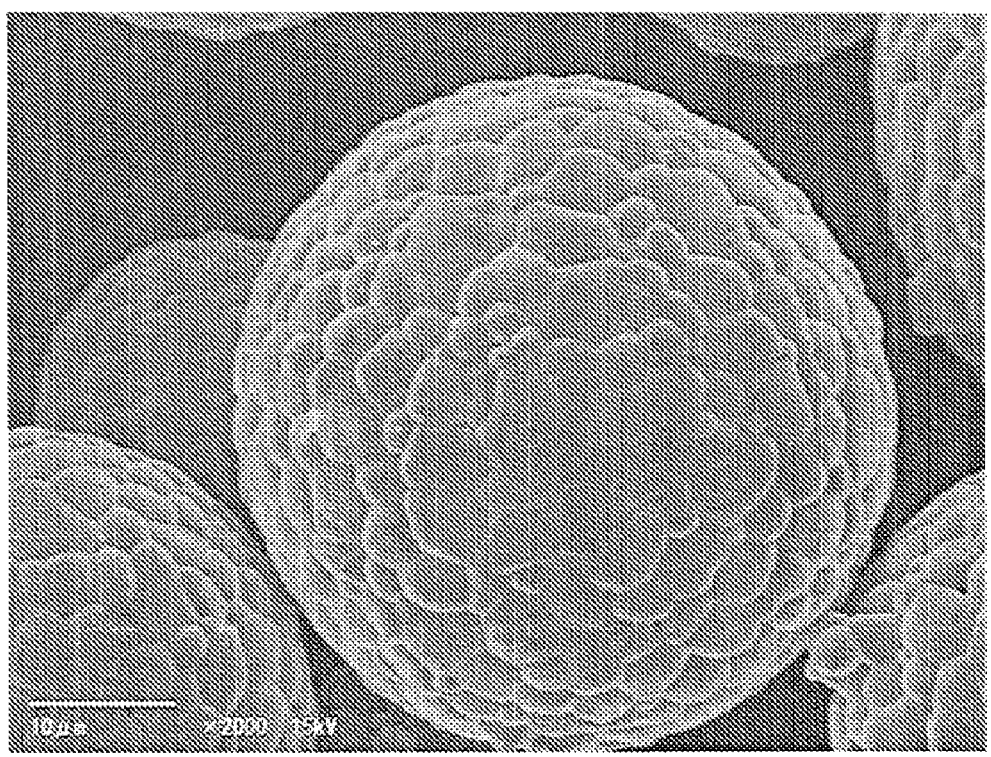
FIG. 1 is a scanning electron microscope photograph of zinc oxide particles of the present disclosure obtained in Example 1.

In the following, the present disclosure is described in detail.

The present disclosure relates to a zinc oxide particle which can be used for various exoergic materials and has median size (D50) of 17 to 10000 μm and a method for producing it. In the conventional use of the exoergic fillers, there is no example with a zinc oxide having median size (D50) of 17 to 10000 μm and density of 4.0 g/cm$^3$ or more used, and the method for producing such zinc oxide has not been investigated. The present disclosure has been completed by finding that the zinc oxide particle having the specified median size (D50) and density has a more preferred property than conventional zinc oxide.

The zinc oxide particle of the present disclosure has density of 4.0 g/cm$^3$ or more and median size (D50) of 17 to 10000 μm. That is, the zinc oxide particle is characterized by larger particle diameter and higher density than the conventional one. Such zinc oxide particle has not been publicly known and it first produced by the inventors of the present disclosure. In the specification, when a powder is divided by particle diameter based on the median size (D50) into two groups, bigger group and smaller group have equal amounts. The median size (D50) is measured by laser diffraction/scattering particle size distribution analyzer LA-750 (manufactured by HORIBA, Ltd.), or by statistical means with the eye. The visual observation can be done by scanning electron microscope JSM-5400 (manufactured by JEOL, Ltd.). The particle has superior property as the exoergic filler derived from the function mentioned above, because the median size (D50) thereof is within the defined range.

The lower limit of the median size is preferably 17 μm, and more preferably 20 μm. The upper limit of the median size (D50) is preferably 1000 μm and more preferably 100 μm.

The density of the zinc oxide particle of the present disclosure can be measured by Gay-Lussac type pycnometer. The lower limit of the density is more preferably 4.0 g/cm$^3$ and still more preferably 4.5 g/cm$^3$. The high-density zinc oxide particle defined by the above-mentioned range easily produces heat conductivity and has superior property as the exoergic filler because the particle is dense particle with a few hollow portions. If the density is less than 4.0 g/cm$^3$, sufficient exoergic property needed for the present disclosure can not be obtained.

The zinc oxide particle of the present disclosure preferably have apparent density of 2.50 g/ml or more measured by JIS K 5101-12-1 test methods for pigment-apparent density or apparent specific volume (static method). Such apparent density is an indicative value of densification, high density, and regulation and uniformity in shape of the particle. Such zinc oxide particle having high apparent density has the advantage that the particle shows superior exoergic property due to high density of the particle itself and the filling rate to a resin can be increased for the reason that the particle has spherical shape and high uniformity.

The zinc oxide particle of the present disclosure preferably have tap bulk density of 3.10 g/cm$^3$ or more measured according to JIS R 1639-2. Such zinc oxide particle showing high tap bulk density has the advantage that the particle has superior exoergic property due to high density of the particle itself and the filling rate to a resin can be increased for the reason that the particle has spherical shape and high uniformity.

The zinc oxide particle of the present disclosure is preferably spherical. Spherical particles can be closest-packed, so the proportion of the exoergic filler can be increased. Preferably, this results in higher exoergic property. The shape of the particle can be observed by scanning electron microscope JSM-5400 (manufactured by JEOL, Ltd.). The zinc oxide particle preferably has an aspect ratio of 1.0 to 1.5. When the particle is used as an exoergic filler, as the aspect ratio comes close to 1.0, the orientation of the fillers gets less. Therefore, a resin molded article in which fillers are filled uniformly can be obtained by pressure molding from all angles. The aspect ratio is more preferably 1.10 or less.

In the zinc oxide particles of the present disclosure, 90% or more of the particles preferably have the aspect ratio of 1.10 or less. That is, the filling rate when used as filler is easily decreased if particles having high aspect ratio and low sphericity are mixed. Therefore, it is preferred that particles having true spherical shape are mixed at high rate. In addition, if 90% or more particles have the aspect ratio of 1.10 or less when the aspect ratio of all particles existing in the field of vision in an electron microscope photograph were measured and the aspect ratio of 250 particles in all were measured by the above-mentioned operation, we judged that 90% or more of the particles have aspect ratio of 1.10 or less.

The zinc oxide particle of the present disclosure preferably contains at least 85.0 weight % of zinc oxide as oxide. That is, it may contain other metallic elements than zinc. In this case, the content of the other metallic elements than zinc are preferably less than 15.0 weight % as oxide relative to the weight of the zinc oxide particle. The zinc oxide particle in which the content of zinc oxide is high is preferably because heat conductivity is easily generated and it has an excellent property as the exoergic filler.

The zinc oxide particle of the present disclosure may contain at least 85.0 weight % of zinc oxide and as the other metals, at least one metallic element selected from the group consisting of Mg, Ca, Ni, Co, Li, Na, K and Cu of less than 15.0 weight % relative as oxide to the weight of the zinc oxide particle.

The zinc oxide particle containing the above-mentioned metallic element of less than 15.0 weight % relative to the weight of the zinc oxide particle is preferred regarding high insulation property. Zinc oxide is a material having high conductivity. For this reason, when the zinc oxide particle of the present disclosure is used as an exoergic filler for electronic devices, the high conductivity may not be preferred.

The content of the metallic element is more preferably less than 15.0 weight % as oxide relative to the weight of the zinc oxide particle and still more preferably 2.0 to 5.0 weight %. The lower limit of the contained amount is not particularly limited but is preferably 0.1 weight % for increasing insulation property enough.

An exoergic filler has the function to increase the exoergic property when filled up into a grease and a resin sheet. However, it is desired that the exoergic filler have high insulation property because these grease and sheet are often used for electronic devices. The insulation property of resins used for such purpose is generally high. If insulation property of a material filled inside is low, the insulation property as a whole is decreased. Therefore, the exoergic materials to be used preferably also have high insulation property.

If zinc oxides of 62.9 volume % are filled as an exoergic material in a resin which having insulation property or specific volume resistance value of $10^{15}$ Ω·cm when molded into a sheet shape, the specific volume resistance value of the sheet will be greatly-reduced to $10^9$ to $10^{10}$ Ω·cm. If alumina, being a material having high insulation property, is filled in the same composition as previously explained, the specific volume resistance value of the sheet will be $10^{14}$ to $10^{15}$ Ω·cm. Therefore, a great reduction of the specific volume resistance value is not occurred, but alumina is disadvantageous in that its hardness is high as mentioned above. As an exoergic material which is used for an electronic device, a material having high exoergic and insulation properties and low hardness.

The zinc oxide particle containing at least one metallic element selected from the group consisting of Mg, Ca, Ni, Co, Li, Na, K and Cu has notably high insulation property compared to a high-purity zinc oxide. Therefore, the zinc oxide particle containing the metallic element is preferably used for the purpose that requires high insulation property. If the zinc oxide particles containing a metallic element of 62.9 volume % are filled up as an exoergic material into a resin which having specific volume resistance value of $10^{15}$ Ω·cm when molded into a sheet shape, it is preferred that the specific volume resistance value of the obtained sheet can be maintained at a level of $10^{11}$ Ω·cm or more.

If the content of at least one metallic element selected from the group consisting of Mg, Ca, Ni, Co, Li, Na, K and Cu is 15.0 weight % or more as oxide relative to the weight of the zinc oxide particle, it is not preferred because the exoergic property decreases.

In addition, when the zinc oxide particle contains the above-mentioned metallic elements, high insulation property can be obtained. However, when the zinc oxide particle contains other metallic elements, the enhancing-effects for insulation property may not be obtained. So, in the present disclosure, it is preferred to contain the specified metallic element.

Therefore, it is preferred that aluminum which is an undesirable metallic element in the viewpoint of the insulation property is not actively added and aluminum is not contained substantially. More specifically, the content is preferably 0.0001 weight % or less as $Al^{3+}$ relative to the weight of the zinc oxide particle.

Generally, it is done to combine small particle, middling particle, and large particle concerning particle diameter for high exoergic property of the exoergic material. The zinc oxide particle of the present disclosure has preferably D90/D10 of 3.0 or less. That is, the ratio of D90 and D10 is preferably small (that is, a coarse particle having extremely large particle diameter is few contained). In this way, the exoergic filler which can be closest-packed is preferably produced because arbitrary-sized particles can be arbitrarily mixed by decreasing the content of coarse particles and making particle size distribution sharper.

D10 and D90 are values determined by measuring the particle size distribution. D10 means 10% cumulative particle diameter on volume basis and D90 means 90% cumulative particle diameter on volume basis. These values are measured by the same method as the median size (D50).

As mentioned above, the zinc oxide particle is not particularly limited concerning the producing method thereof, but it can be produced by the following method. This method for producing a zinc oxide particle described after in detail is one aspect of the present disclosure.

The zinc oxide particle of the present disclosure can be obtained by a method for producing a zinc oxide particle, comprising a step (1) of mixing a source of the zinc oxide particle with at least one compound selected from the group consisting organic acids, organic bases, inorganic acids, inorganic bases, and salts thereof to granulate, and a step (2) of baking the granulated particle obtained in the step (1). By using the above-mentioned method, it becomes possible to produce large amounts of zinc oxide particles having median size (D50) of 17 to 10000 µm that show few particle fusion and are baked into particle inside well. The above-mentioned method for producing a zinc oxide particle is suitable method for producing spherical zinc oxide particles.

The method for producing a zinc oxide particle of the present disclosure comprises the step (1) of mixing a source of the zinc oxide particle with at least one compound selected from the group consisting of organic acids, organic bases, inorganic acids, inorganic bases, and salts thereof to granulate. The step (1) is a step of re-pulping a source of the zinc oxide particle in water and mixing with an organic acid, an organic base, an inorganic acid, an inorganic base, or salt thereof to granulate.

In the method for producing a zinc oxide particle of the present disclosure, a source of the zinc oxide particle is used as a raw material. As the source of the zinc oxide particle is not particularly limited provided that it may converted to zinc oxide by baking but includes zinc oxide, zinc nitrate, zinc sulfate, zinc carbonate, zinc hydroxide, zinc acetate, and so on. As the above-mentioned source of the zinc oxide particle, zinc oxide is especially preferred. The source of the zinc oxide particle preferably has median size (D50) of 0.01 to 1.0 µm. The median size (D50) of the source of the zinc oxide particle is measured by laser diffraction/scattering particle size distribution analyzer LA-750 (manufactured by HORIBA, Ltd.) or dynamic light scattering particle size distribution analyzer ELS-Z2 (manufactured by OTSUKA ELECTRONICS, Ltd.).

The zinc oxide which is used as a raw material is not particularly limited, but the zinc oxide produced in French Method, American Method and other common methods can be used. Particularly, zinc oxide which is produced in French Method is preferably used because the zinc oxide has few impurities.

The organic acid, organic base, inorganic acid, and inorganic base include, for example, acetic acid, citric acid, propionic acid, butyric acid, lactic acid, oxalic acid, stearic acid, nitric acid, sulfuric acid, hydrogen peroxide, hydroxide ion, ammonia, pyridine, piperazine, imidazole and so on. The salt thereof contains, for example, ammonium salt, zinc salt, magnesium salt, copper salt, calcium salt, nickel salt, cobalt salt, sodium salt, potassium salt, lithium salt, amine salt, and cesium salt. More specifically, ammonium polycarboxylate, zinc acetate, magnesium acetate, copper acetate, sodium acetate, potassium acetate, lithium acetate, lithium stearate, zinc nitrate, lithium nitrate, magnesium nitrate, copper nitrate, calcium acetate, nickel acetate, cobalt acetate, zinc sulfate, lithium hydroxide, sodium hydroxide, potassium hydroxide and cesium hydroxide may be used.

Especially, sodium salt, potassium salt, and lithium salt is preferred because it is able to make the surface of the baked particle smooth and adjust the particle shape.

The mixing amount of the organic acid, organic base, inorganic acid, inorganic base and salt thereof depends on a component to be mixed but is preferably 0.1 weight % to less than 15.0 weight % as oxide relative to the weight of the source of the zinc oxide particle when a metal salt is used. Because zinc oxides are baked densely on baking process and the insulation property is increased.

When acetic acid is used as the organic acid, organic base, inorganic acid, inorganic base, or salt thereof, the mixing amount of the acetic acid is preferably 0.1 to 10.0 weight % relative to the weight of the source of the zinc oxide particle because zinc oxides are baked densely on baking process.

However, the organic acid, organic base, inorganic acid, inorganic base, or salt thereof should not be one containing a halogen component such as ammonium bromide and hydrochloric acid. When the compound containing a halogen component is mixed, it is hard to obtain a zinc oxide particle being spherical and having median size (D50) of 17 to 10000 μm.

The zinc oxide particle containing zinc oxide of 85.0 weight % or more and at least one metallic element selected from the group consisting of Mg, Ca, Ni, Co, Li, Na, K and Cu of less than 15.0 weight % as oxide relative to the weight of the zinc oxide can be obtained by using a compound containing the metallic element as a part or all of the organic acid, organic base, inorganic acid, inorganic base, or salt thereof.

As the organic acid, organic base, inorganic acid, inorganic base, or salt thereof that can be used for the purpose, for example, magnesium acetate, magnesium nitrate, magnesium hydroxide, calcium acetate, nickel acetate, cobalt acetate, copper acetate, copper nitrate, sodium acetate, potassium acetate, lithium acetate, and lithium hydroxide may be cited.

As the other method for producing, the zinc oxide particle can be also obtained by combining the organic acid, organic base, inorganic acid, inorganic base, or salt thereof with a metallic compound containing at least one metallic element selected from the group consisting of Mg, Ca, Ni, Co, Li, Na, K and Cu. The metallic compound which can be used in such method includes, for example, oxides of Mg, Ca, Ni, Co, Li, Na, K and Cu.

The compound containing the metallic element can be obtained in the range of 0.1 to less than 15.0 weight % as oxide relative to the weight of the source of the zinc oxide particle. Both exoergic and high insulation properties can be obtained by conducting in the above range.

The granulation in the step (1) is not particularly limited about the method thereof, but it can be conducted by a method comprising dispersing the source of the zinc oxide particle and the organic acid, organic base, inorganic acid, inorganic base, or salt thereof not containing a halogen into water to prepare a slurry and spray drying and other methods. In addition, there is a method comprising adding an aqueous solution of the organic acid, organic base, inorganic acid, inorganic base, or salt thereof not containing a halogen to the source of the zinc oxide particle and mixing them with spartan granulator, spartan mixer, henschel mixer, or marumerizer to granulate and other methods.

In the step (1), if the case of using the slurry, a dispersant may be used. It is preferred to use a fatty acid salt as the organic acid salt because the organic acid salt itself has a dispersant function so the slurry can be obtained easily. Compounds that can be used suitably as dispersant are not particularly limited but include ammonium polycarboxylate salt (POIZ532A manufactured by KAO Corporation, Ltd.).

A method for preparing the slurry is not particularly limited but includes, for example, a method comprising adding the above-mentioned components to water and dispersing at 18 to 30° C. for 10 to 30 minutes to obtain homogeneous slurry having the source of the zinc oxide particle content of 100 to 1500 g/l.

The method of spray drying is not particularly limited but includes, for example, a method comprising spraying the slurry into flowing air at about 150 to 300° C. by two-fluid nozzle or rotary disc to produce granulated particles having particle diameter of about 20 to 100 μm. On this occasion, it is preferred to adjust the slurry concentration within the range of 50 to 3500 cps of the viscosity of the slurry. The viscosity of the slurry is measured by using B-type viscometer (manufactured by TOKYO KEIKI, Ltd.) with 60 rpm share. In this flowing air, the granulated particles being dried are trapped by a filter with submicron order (bag filter). If the slurry viscosity, drying temperature, and flowing speed are without the desired range, the granulated particles becomes hollow or takes depressed shape.

The zinc oxide particles can be obtained by baking the particles thus obtained. The baking conditions are not particularly limited but it is preferred to conduct the baking under the condition that the baking temperature is 700 to 1500° C., the baking time is 1 to 3 hours and the baking is static baking. The static baking can be conducted in a pot made of mullite or mullite/cordierite. The baking is more preferably conducted at 1000 to 1200° C. By baking in the above-mentioned method, zinc oxide particles showing few particle fusion and being baked densely into the particle inside can be obtained.

The baking at less than 700° C. is not preferred because the particle may not be baked sufficiently into the particle inside. If exceeding 1500° C., it is not preferred because the particle fusion proceeds.

The zinc oxide particles obtained by the above method have a sharp particle size distribution, but the zinc oxide particles may be classified using a sieve if sharper particle size distribution is required or in order to remove a few coarse particles contained therein. The classification using a sieve includes wet classification and dry classification.

Even if the particle size of the source of the zinc oxide particle as a raw material varies in the method, the same zinc oxide particles as mentioned above can be obtained by adjusting the amount of the organic acid, organic base, inorganic acid, inorganic base, and salt thereof not containing a halogen, the amount of the dispersant, the slurry concentration, and the baking temperature, suitably. In the case of spray drying, it is able to control the particle size by varying the slurry supplied amount in the case of two-fluid nozzle, and by varying the number of rotations in the case of rotary disc. By raising the baking temperature, the density of the baked zinc oxide particle can be increased.

The zinc oxide particles obtained by the above method have the following advantages over the conventional zinc oxide particles;
1. It is possible to increase the particle size and make the particle spherical.
2. It is not needed to use a flux that may damage an oven in the production method.
3. The particle can be filled in a resin in the large amount.
4. When the particles are filled up densely in a resin, extremely good exoergic property can be showed.

This effect is derived from the fact that the particle diameter is extremely larger than the conventional zinc oxide particle, the particle shape is controlled to have spherical shape, and crystallinity and density are high.

The use of the zinc oxide particle of the present disclosure is not particularly limited but the particles can be used as an exoergic filler, for example. This exoergic filler is one aspect of the present invention.

When the zinc oxide particle is used as exoergic filler, the particles can be used in the form of a resin composition obtained by mixing with a resin. In this case, the resin may be a thermoplastic resin or a thermosetting resin and includes epoxy resins, phenol resins, polyphenylene sulfide resins (PPS), polyester resins, polyamides, polyimides, polystyrenes, polyethylenes, polypropylenes, polyvinyl chloride, polyvinylidene chloride, fluorine resins, polymethyl methacrylate, ethylene/ethyl acrylate copolymer resin (EEA), polycarbonates, polyurethanes, polyacetals, polyphenylene ethers, polyetherimides, acrylonitrile-butadiene-styrene copolymer resin (ABS), epoxides, phenols, liquid crystal resins (LCP), silicone resins, acrylic resins and other resins.

The exoergic resin composition of the present disclosure may be (1) a resin composition for thermal molding obtained by kneading a thermoplastic resin and the zinc oxide particle in melting condition, (2) a resin composition obtained by kneading a thermosetting resin and the zinc oxide particle followed by thermosetting, (3) a resin composition for paint obtained by dispersing the zinc oxide particle in a resin solution or dispersion liquid, or other resin composition.

The addition amount of the zinc oxide particle in the exoergic resin composition of the present disclosure can be arbitrarily determined according to the intended performance of the resin composition such as exoergic property, hardness and so on. In order to express the exoergic property of the zinc oxide particle sufficiently, the addition amount of the zinc oxide particle is preferably 60 volume % or more, more preferably 68 volume % or more relative to the total solid matter of the resin composition.

When the exoergic resin composition of the present disclosure is a resin composition for thermal molding, the resin component may be selected in accordance to the use. For example, when the resin composition is placed between the heat source and the exoergic plate to make them stick together, resins having high adhesion property and low hardness such as silicone resins and acrylic resins can be selected.

When the exoergic resin composition of the present disclosure is a resin composition for paint, the resin may be a hardenable one or a nonhardenable one. The coating composition may be a solvent type one containing organic solvents or an aqueous type one containing a resin dissolved or dispersed in water.

When the zinc oxide particle is used as an exoergic filler, the particle may be used as an exoergic grease obtained by mixing with a base oil which contains a mineral oil or a synthetic oil. When the particles are used as this exoergic grease, as the synthetic oil, α-olefins, diesters, polyol esters, trimellitic esters, polyphenyl ethers, alkylphenyl ethers and so on can be used. In addition, the particles can be used as an exoergic grease obtained by mixing with silicone oils.

When the zinc oxide particle of the present disclosure is used as an exoergic filler, the particle may be used in combination with other components. The other components which may be used together, include other exoergic fillers than zinc oxide such as metal oxides including magnesium oxide, titanium oxide and aluminum oxide, aluminum nitride, boron nitride, silicon carbide, silicon nitride, titanium nitride, metallic silicon, and diamond, resins and surfactants.

The zinc oxide particle of the present disclosure can obtain better exoergic property by combining other zinc oxide particles having smaller median size (D50) and other exoergic filler. The zinc oxide particle having smaller median size (D50) to be used in combination preferably takes spherical shape, needle shape, bar shape or plate-like shape.

The zinc oxide particle of the present disclosure can be used in the fields such as rubber accelerators, pigments for coating compositions and inks, such electronic components as ferrite and varistor, medicinal products and cosmetics in addition to the exoergic filler.

Also, the zinc oxide particle containing at least one metallic element selected from the group consisting of Mg, Ca, Ni, Co, Li, Na, K and Cu can be used suitably as the exoergic filler used in the electronic device fields because of superior insulation property.

EXAMPLES

Hereinafter, the present disclosure will be described in more detail by way of examples, but the present disclosure is not limited to these examples.

Examples 1

Figure 2:
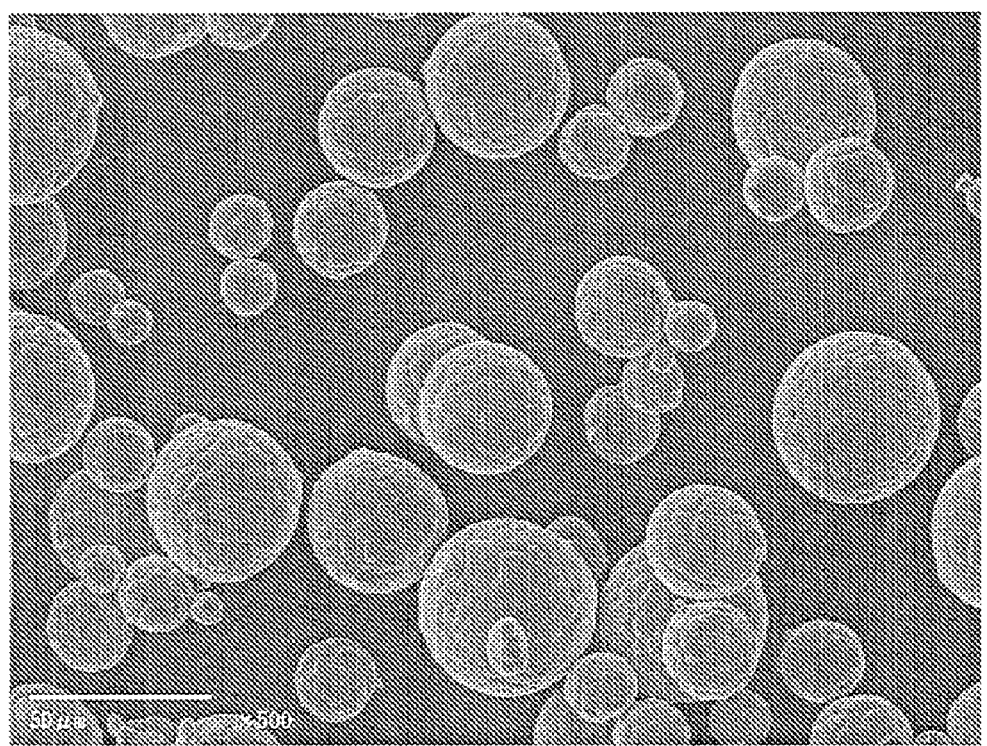
FIG. 2 is a scanning electron microscope photograph of zinc oxide particles of the present disclosure obtained in Example 1 at different magnification from FIG. 1.
Figure 3:
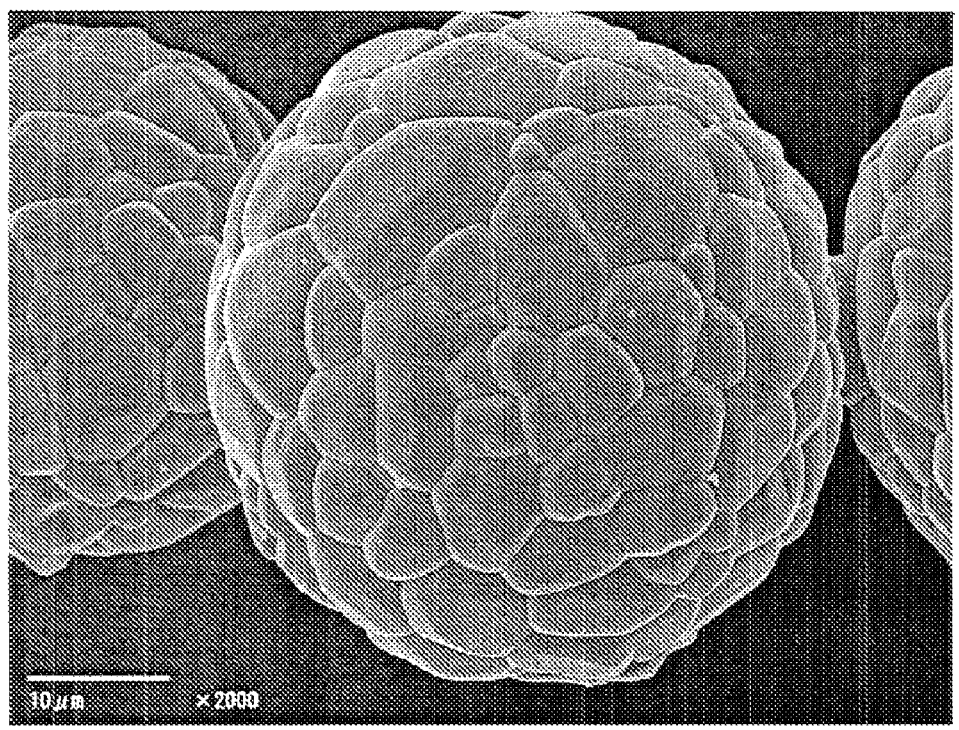
FIG. 3 is a scanning electron microscope photograph of zinc oxide particles of the present disclosure obtained in Example 2.
Figure 4:
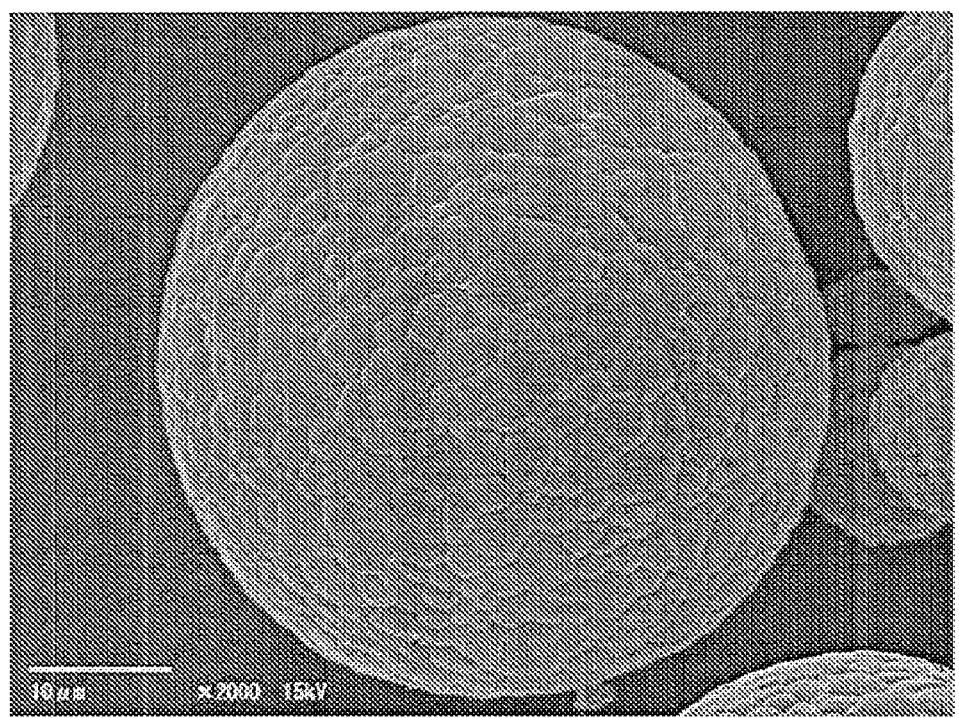
FIG. 4 is a scanning electron microscope photograph of zinc oxide particles of the present disclosure obtained in Example 3.
Figure 5:
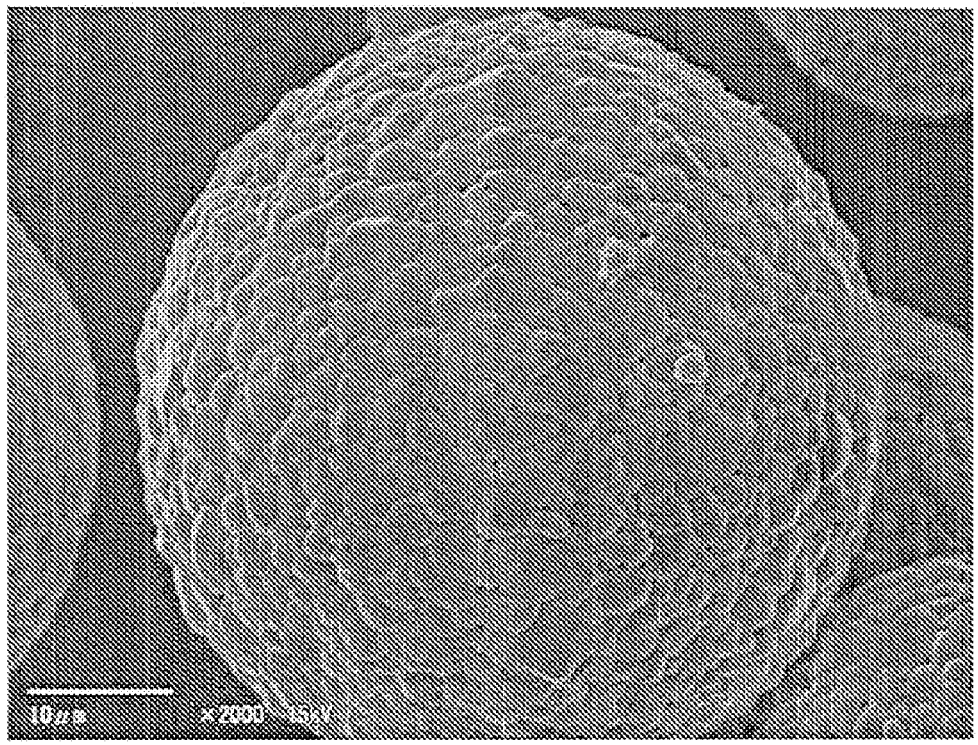
FIG. 5 is a scanning electron microscope photograph of zinc oxide particles of the present disclosure obtained in Example 4.
Figure 6:
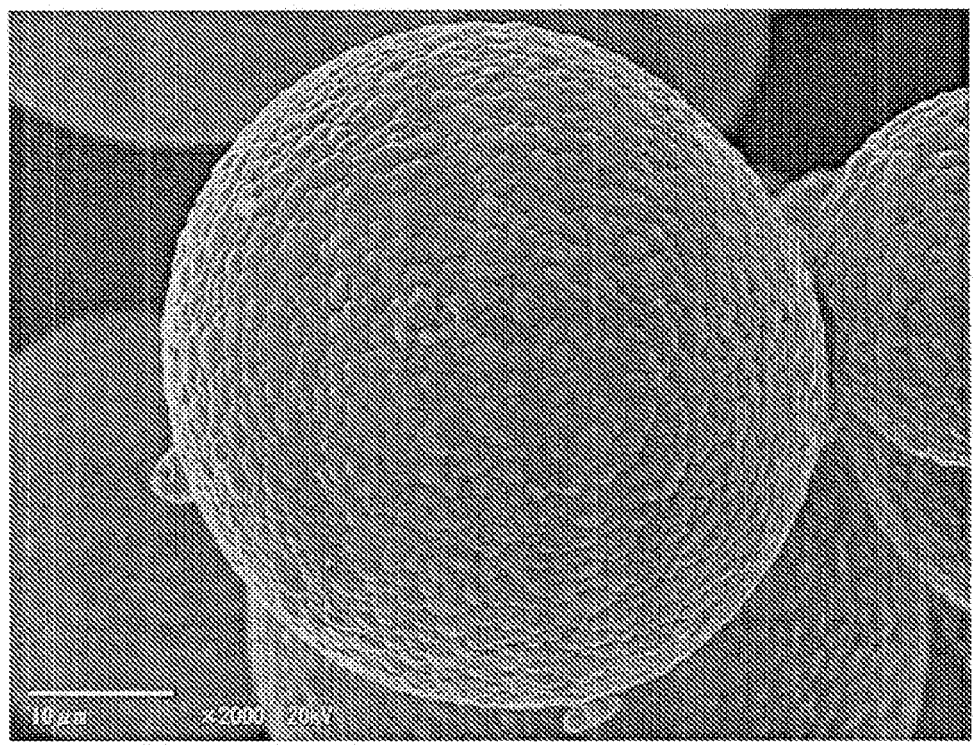
FIG. 6 is a scanning electron microscope photograph of zinc oxide particles of the present disclosure obtained in Example 5.
Figure 7:
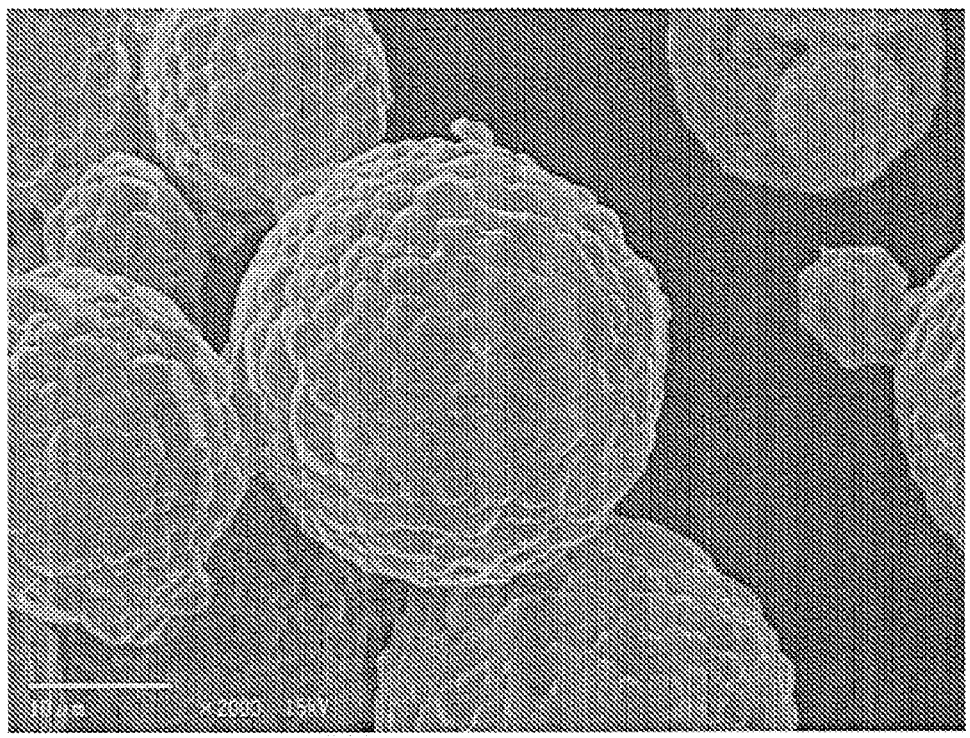
FIG. 7 is a scanning electron microscope photograph of zinc oxide particles of the present disclosure obtained in Example 6.

ZINC OXIDE SUPERFINE (manufactured by Sakai Chemical Industry, Ltd., median size (D50) 0.2 µm) 600 g was re-pulped into water, dispersant (manufactured by KAO, Ltd., POIZ532A) 3.50 weight % relative to the weight of the ZINC OXIDE SUPERFINE were added to the aqueous solution, and acetic acid 0.61 weight % was added to prepare a slurry with concentration of 600 g/l. Next, this slurry was spray dried by using TYPE DCR LABO SPRAY DRYER (manufactured by Sakamoto Giken, Ltd.) to obtain granulated particles. These particles were put in a pot made of mullite or mullite/cordierite and static baked at 1200° C. for 3 hours. After cooling and dispersing into water 1.0 liter, this slurry was screened through a sieve of 200 mesh (opening of screen 75 µm). The slurry passing through the mesh was filtered and dried to obtain zinc oxide particles showing few particle fusion, being baked densely into the particle inside, being spherical and having a median size (D50) of 28.5 µm. The size and shape of the obtained zinc oxide particle were observed by Scanning Electron Microscope JSM-5400 (manufactured by JEOL, Ltd.). The obtained electron microscope photograph was shown in FIG. 1. In addition, the low-powered electron microscope photograph was shown in FIG. 2.

Examples 2 to 6

The zinc oxide particles were obtained by following the same procedure as that of Example 1 except that the organic acid, organic base, inorganic acid, inorganic base, and the salts thereof not containing a halogen to be added, the addition amount thereof, and treatment conditions were changed as shown in Tables 1 and 2.

Example 7

Figure 8:
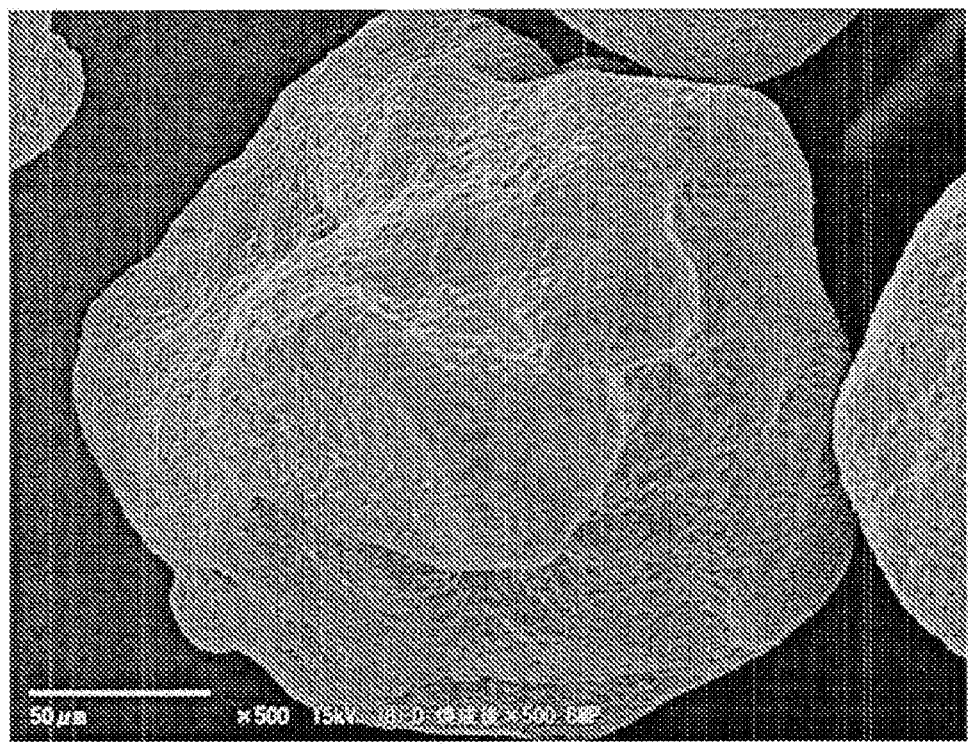
FIG. 8 is a scanning electron microscope photograph of zinc oxide particles of the present disclosure obtained in Example 7.
Figure 9:
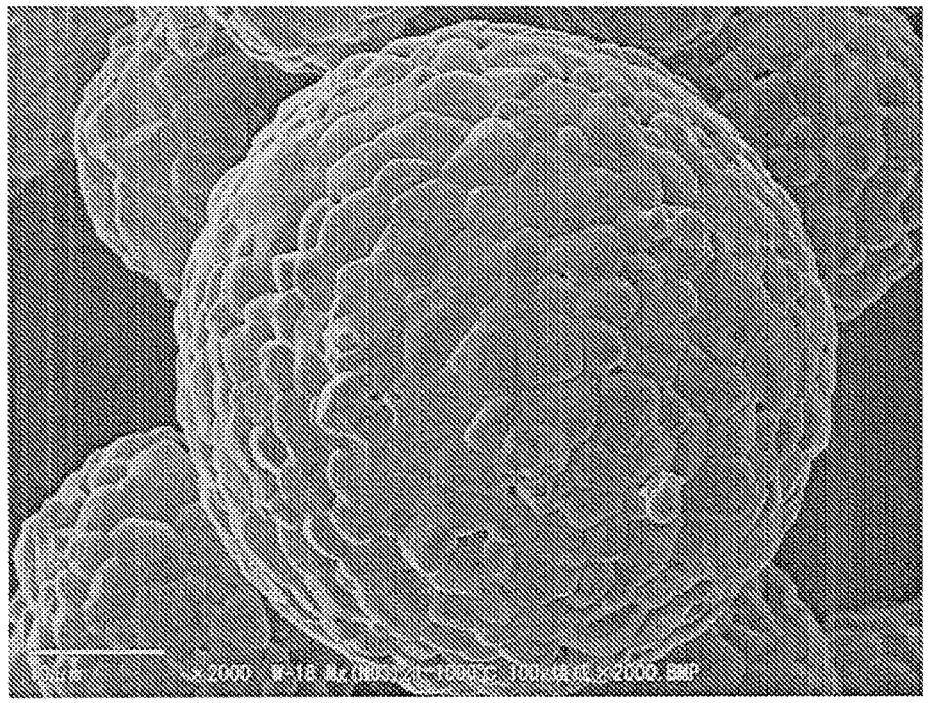
FIG. 9 is a scanning electron microscope photograph of zinc oxide particles of the present disclosure obtained in Example 8.
Figure 10:
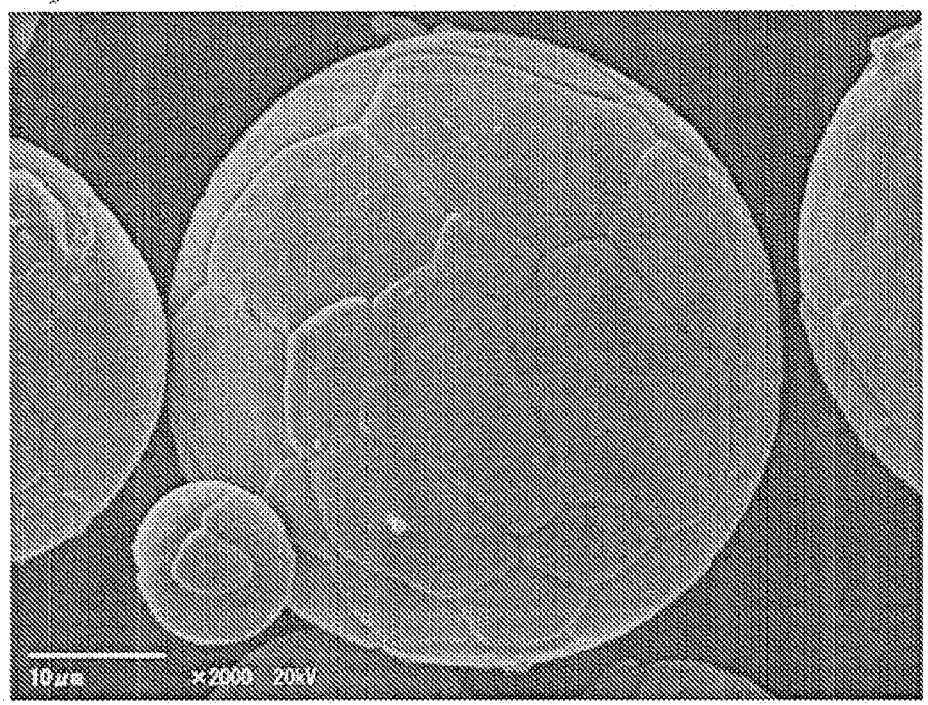
FIG. 10 is a scanning electron microscope photograph of zinc oxide particles of the present disclosure obtained in Example 9.
Figure 11:
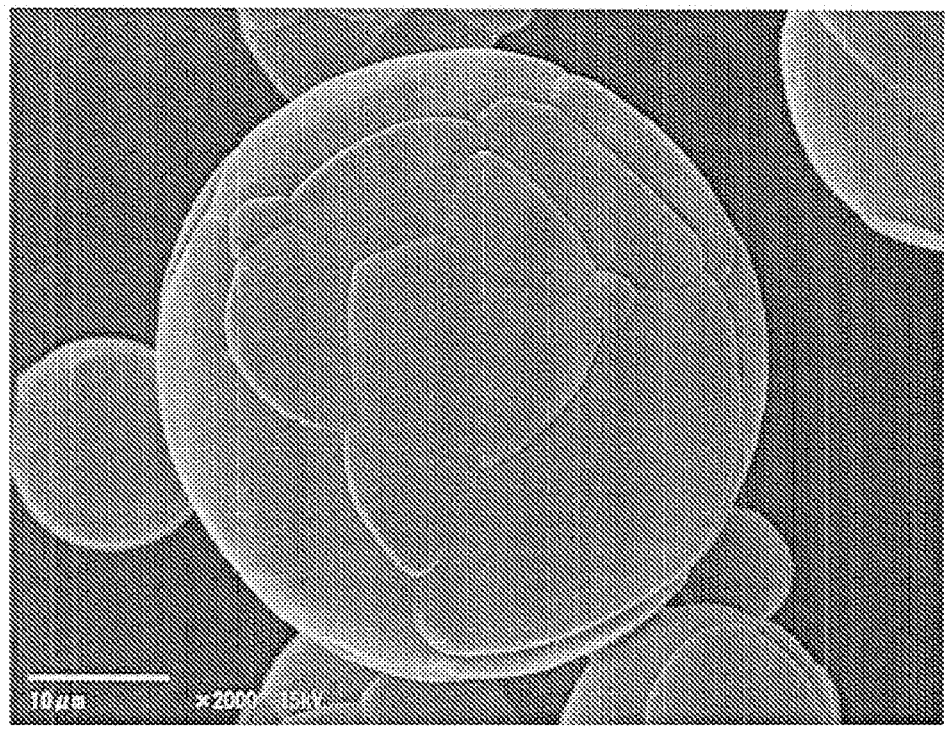
FIG. 11 is a scanning electron microscope photograph of zinc oxide particles of the present disclosure obtained in Example 10.
Figure 12:
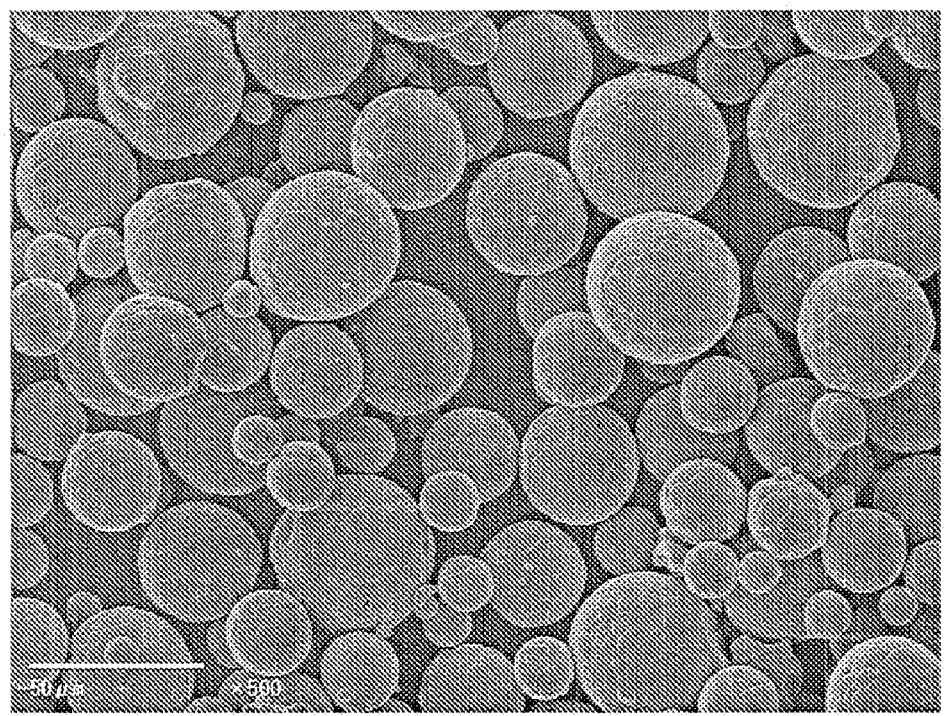
FIG. 12 is a scanning electron microscope photograph of zinc oxide particles of the present disclosure obtained in Example 10 at different magnification from FIG. 11.
Figure 13:
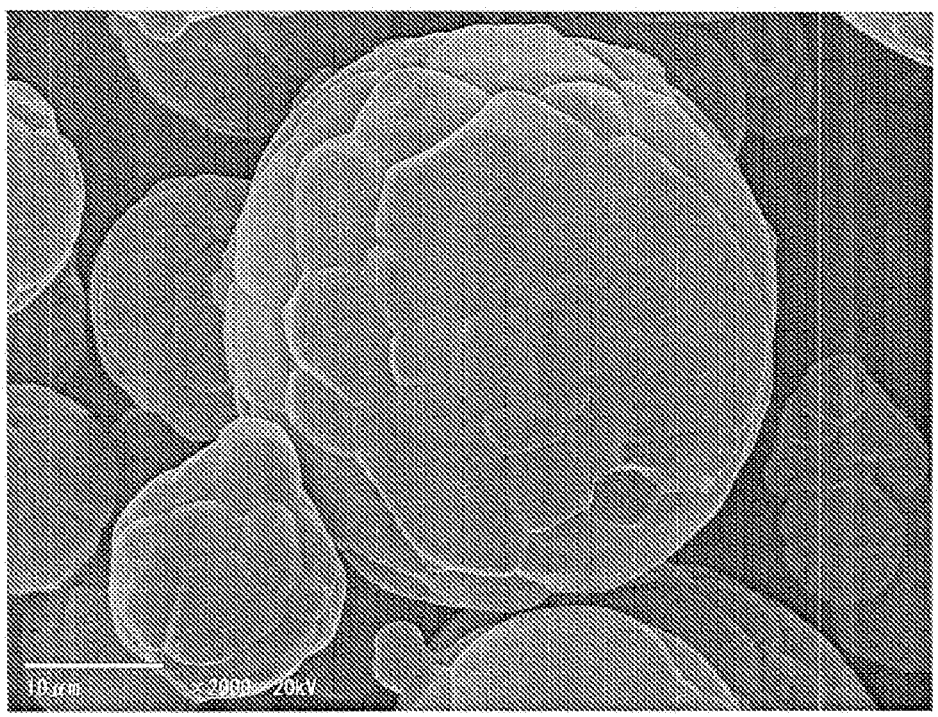
FIG. 13 is a scanning electron microscope photograph of zinc oxide particles of the present disclosure obtained in Example 11.
Figure 14:
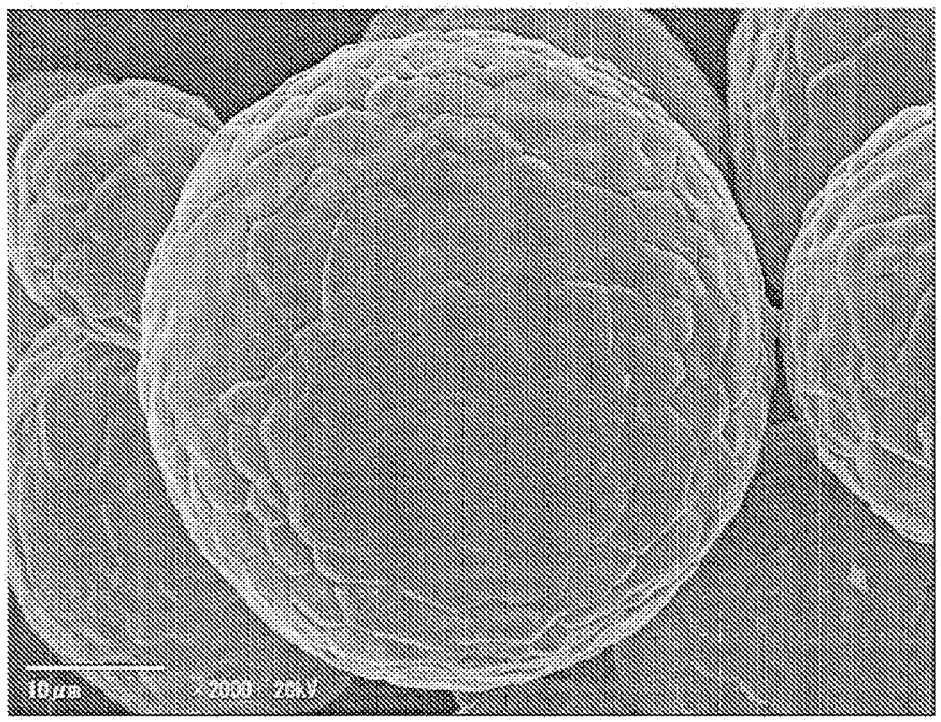
FIG. 14 is a scanning electron microscope photograph of zinc oxide particles of the present disclosure obtained in Example 12.
Figure 15:
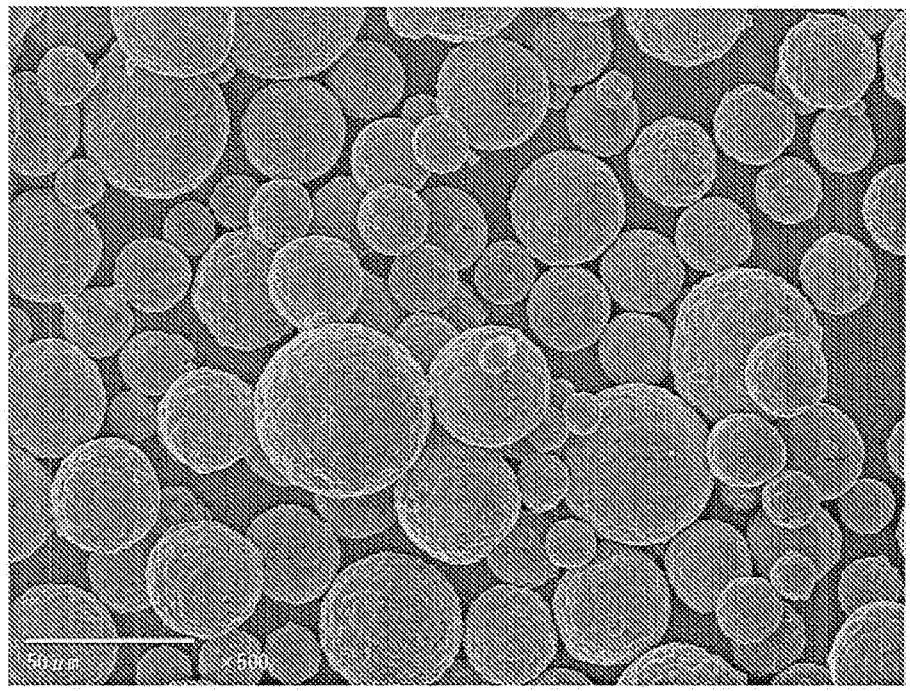
FIG. 15 is a scanning electron microscope photograph of zinc oxide particles of the present disclosure obtained in Example 12 at different magnification from FIG. 14.
Figure 16:
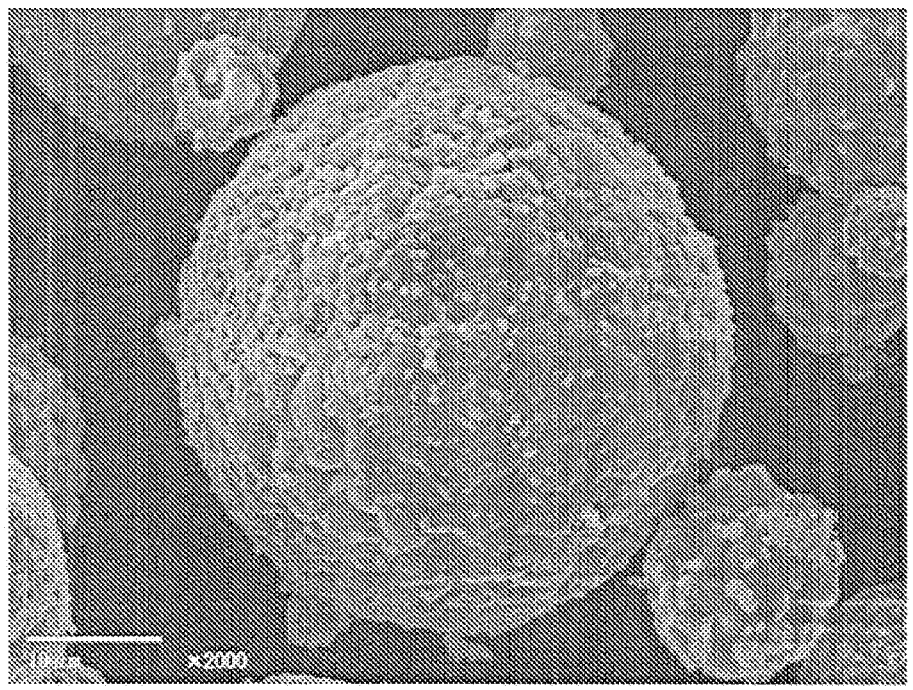
FIG. 16 is a scanning electron microscope photograph of zinc oxide particles of the present disclosure obtained in Example 13.
Figure 17:
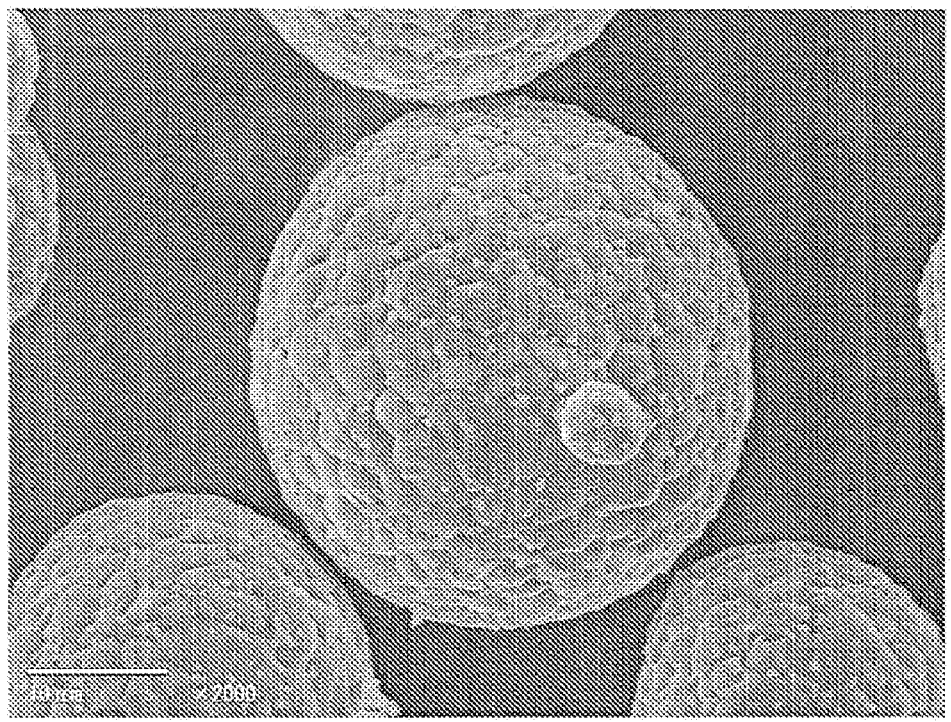
FIG. 17 is a scanning electron microscope photograph of zinc oxide particles of the present disclosure obtained in Example 14.
Figure 18:
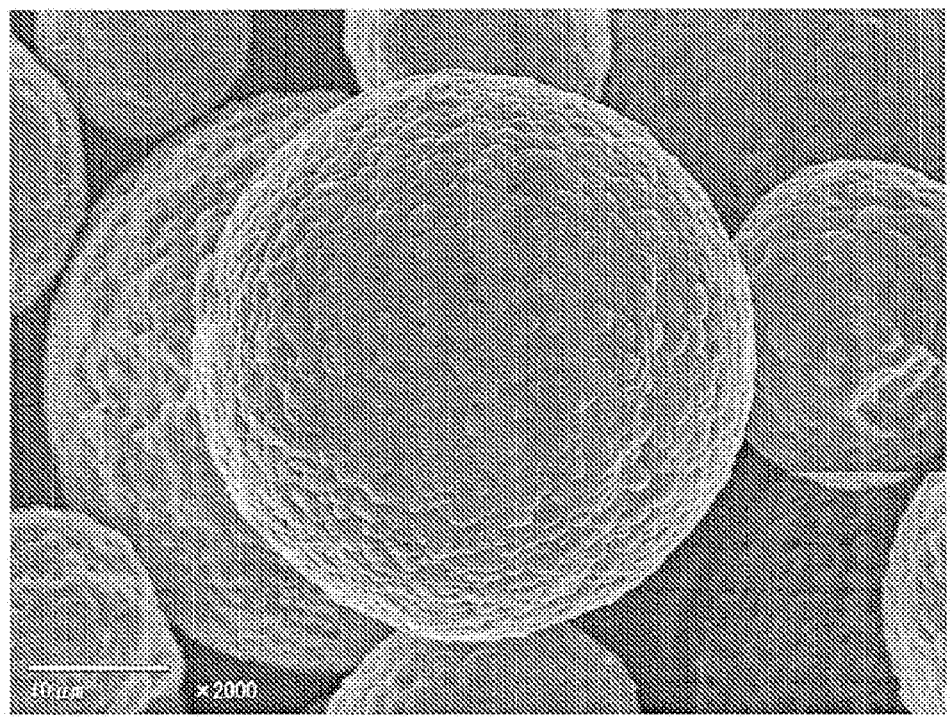
FIG. 18 is a scanning electron microscope photograph of zinc oxide particles of the present disclosure obtained in Example 15.
Figure 19:
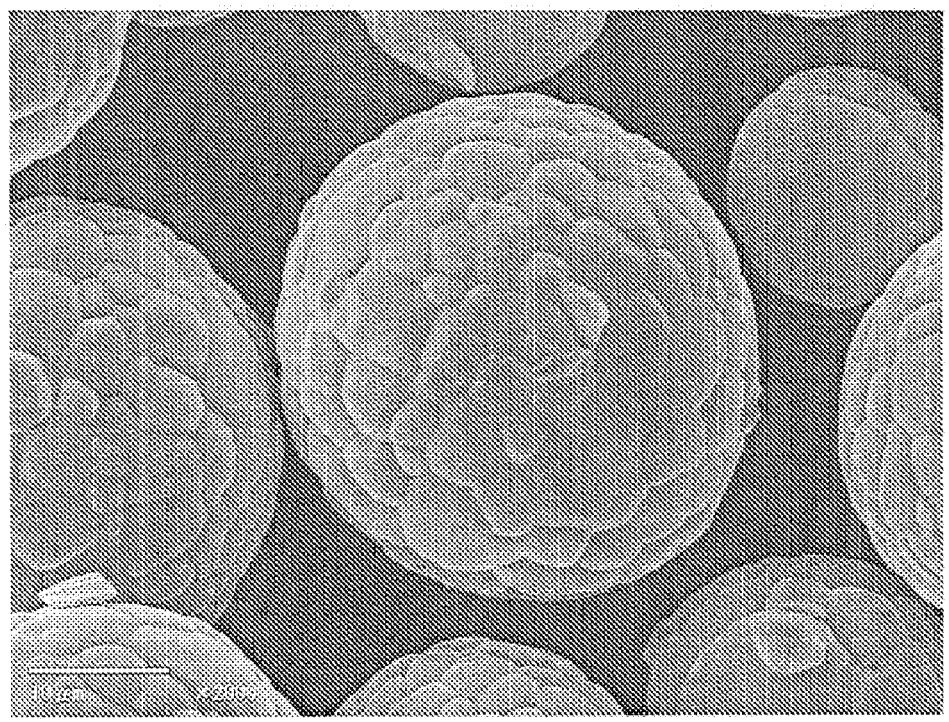
FIG. 19 is a scanning electron microscope photograph of zinc oxide particles of the present disclosure obtained in Example 16.
Figure 20:
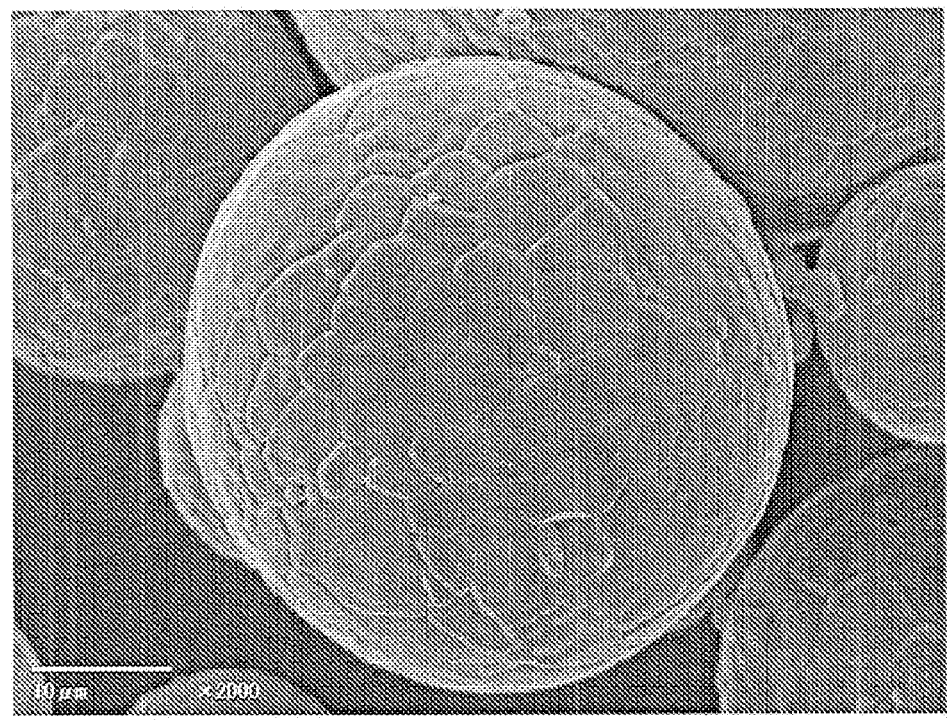
FIG. 20 is a scanning electron microscope photograph of zinc oxide particles of the present disclosure obtained in Example 17.
Figure 21:
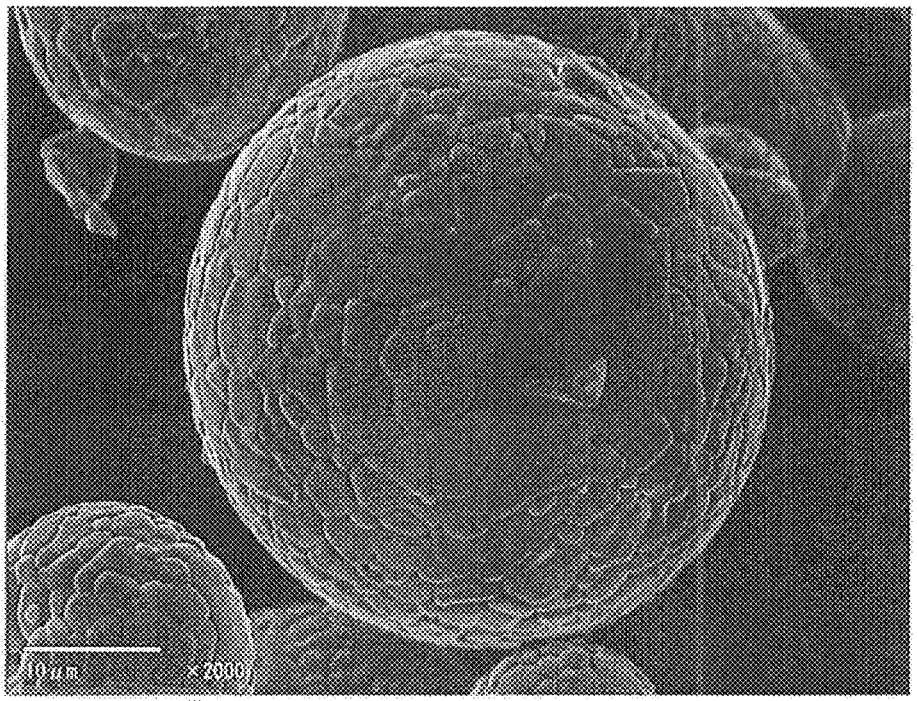
FIG. 21 is a scanning electron microscope photograph of zinc oxide particles of the present disclosure obtained in Example 18.
Figure 22:
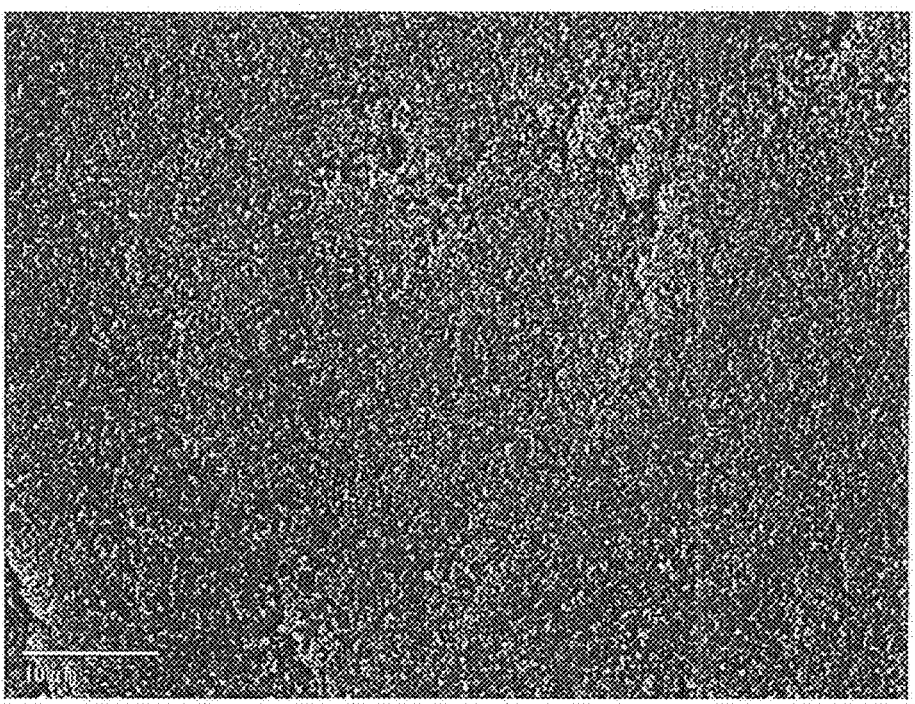
FIG. 22 is a scanning electron microscope photograph of zinc oxide particles in Comparative Example 2.

ZINC OXIDE SUPERFINE (manufactured by Sakai Chemical Industry, Ltd., median size (D50) 0.2 µm) 10 kg was charged into the cylindrical container inside of Spartan granulator RMOJ-15HN (manufactured by DALTON. CO, Ltd.). While adding an aqueous solution of acetic acid 0.61 weight % relative to the weight of ZINC OXIDE SUPERFINE and water 1.8 liter, the mixture was mixed by setting the number of rotations of chopper and mixing arm at 1320 rpm for 240 seconds, and the obtained mixture was mixed at 2410 rpm for 340 seconds after adding the aqueous solution to obtain granulated particles. These particles were put into a pot made of mullite or mullite/cordierite and static baked at 1000° C. for 3 hours. The size and shape of the obtained zinc oxide particle were observed by Scanning Electron Microscope (JSM-5400 manufactured by JEOL, Ltd.), being found that particles baked into the particle inside with the median size (D50) of 223.7 µm were obtained. The obtained electron microscope photograph was shown in FIG. 8.

Examples 8 to 18

The zinc oxide particles were obtained by following the same procedure except that the organic acid, organic base, inorganic acid, inorganic base, and the salts thereof not containing a halogen to be added, the addition amount thereof, and treatment conditions were changed as shown in Tables 1 and 2.

The measurements in Tables 1 to 4 were done by the following method.

(Median size (D50), D10, D90)

Zinc oxide particles 1.0 g weighed were dispersed into 0.025 weight % sodium hexametaphosphate aqueous solution 100 ml. The obtained dispersion liquid was charged into measurement bath of laser diffraction/scattering particle size distribution analyzer LA-750 (manufactured by HORIBA, Ltd.) filled with 0.025 weight % sodium hexametaphosphate aqueous solution and measured under the conditions that circulation speed: 15, ultrasonic wave strength: 7, and ultrasonic wave time: 3 minutes. Median size (D50), D10 and D90 were decided while setting relative refractive index at 1.5 because refractive index of zinc oxide was 1.9 to 2.0 and that of water was 1.3 at room temperature.

(Aspect Ratio)

In the 100 particles in the electron microscope photograph taken by Scanning Electron Microscope JSM-5400 (manufactured by JEOL, Ltd.), long length and short length passing through the center of each particle were measured by a scale and ratio was decided by dividing long length by short length. The aspect ratio was decided by averaging the as ratios. Further, aspect ratios of 250 particles were measured and number ratio (%) of particles having aspect ratio of 1.10 or less was calculated.

(Density)

Weight a (g) of 100 ml Gay-Lussac type pycnometer that had washed and dried was weighed to the digit of 0.1 mg, distilled water was charged to the gauge line, and the weight b (g) of the pycnometer was weighed to the digit of 0.1 mg. Next, after the Gay-Lussac type pycnometer was dried, sample 5 g was charged and weight c (g) of the sample was calculated by weighing the pycnometer. Distilled water was charged until the sample was covered and air contained in the distilled water was removed in vacuum desiccators. Distilled water was charged to the gauge line and the weight d (g) of the pycnometer was weighed to the digit of 0.1 mg to calculate the density according to the following formula.

$$\text{Density}(g/cm^3) = c/((b-a) + c - (d-a))$$

(Apparent Density)

Apparent density was measured by JIS K 5101-12-1 test methods for pigment-apparent density or apparent specific volume (static method).

(Tap Bulk Density)

Tap bulk density was measured with JIS R 1639-2.

(Filling Rate of Filler)

(i) EEA resin (REXPEARL A1150 manufactured by Japan Polyethylene Corporation, Ltd.) and zinc oxide particles of Examples 1, 7, 10 and 12, (ii) EEA resin not containing the filler of Comparative Example 1, (iii) EEA resin and zinc oxide particles of Comparative Examples 2 and 4, and (iv) EEA resin and alumina (manufactured by SHOWA DENKO K. K.) of Comparative Examples 7 and 8 were mixed as shown in Table 4. In other Examples and Comparative Examples, components were mixed by following the same procedure as mentioned above. The filling rate of filler (volume %) was calculated supposing that specific gravity of the EEA resin was 0.945, specific gravity of the zinc oxide particle was 5.55, and specific gravity of alumina particle was 3.80. Having set weight of filler as a (g), specific gravity of the filler as A, weight of the EEA resin as b (g), and specific gravity of the EEA resin as B, filling rate of filler (volume %) was calculated according to the following formula.

$$\text{Filling rate of filler(volume \%)} = (a/A)/(a/A + b/B) \times 100$$

(Making of Sheet of Resin Composition)

(i) EEA resin and zinc oxide particles of Examples 1, 2, 3, 4, 6, 7 and 10 to 18, (ii) EEA resin not containing the filler of Comparative Example 1, (iii) EEA resin and zinc oxide particles of Comparative Examples 2, 4, 5, and 6, and (iv) EEA resin and alumina of Comparative Examples 7 and 8 were heated and mixed in LABO PLASTMILL (manufactured by TOYO SEIKI SEISAKU-SYO, Ltd.) at the number of rotations of 40 rpm and 150° C. for 10 minutes at rate of filling rate of filler (volume %) as shown in Tables 1 to 4. The mixtures of the filler and the resin were taken out and put on a center of a stainless-steel casting mold with 2 mm thickness (150 mm×200 mm). It was nipped with two stainless-steel plates (200 mm×300 mm) from above and below and put on specimen support of MINI TEST PRESS-10 (manufactured by TOYO SEIKI SEISAKU-SYO, Ltd.) followed by pressuring at 150° C. and 0.5 MPa for 5 minutes and then pressuring at 150° C. and 25 MPa for 3 minutes.

Next, the casting mold was put on the specimen support of Steam Press Machine (manufactured by Gonno Yuatsuki Seisakusyo, Ltd.) and then it was cooled at 25 MPa with running coolant water for 5 minutes to obtain a sheet of resin composition after pressuring to 25 MPa with passing steam and heating.

(Specific Volume Resistance Value)

The obtained sheet was put in a constant-temperature oven set at 30° C. and left for 30 minutes or more. Then, the sheet was put between a negative electrode plate made of brass with 70 mm φ and a positive electrode plate made of brass with 100 mm φ. Next, volume resistance was measured by applying 500 V direct current and charging for a minute. It was measured by using digital ultrahigh resistance/micro ammeter (manufactured by ADC Corporation Ltd.). Specific volume resistance value σ(Ω~cm) was calculated according to the following formula.

$$\sigma = \pi d^2/4t \times Ru$$

t: thickness of test piece (sheet) (cm)
d: diameter of innermost electrode
Ru: volume resistance (Ω)

(Heat Conductivity)

Next, the sheet was cut out to be a molded article of 55 mm φ and 2.0 mm thickness by punch and the heat conductivity was measured following setting on the specimen support of AUTOA HC-110 (manufactured by EKO Instruments Co., Ltd, the method with heat flow meter). AUTOA HC-110 was pre-compensated by using Pyrex standard plate with 6.45 mm thickness before measurement. Heat conductivity (W/m·K) when reached a condition of thermal equilibrium at 25° C. was measured by measuring while a high temperature heater was set at 35° C. and low temperature heater was set at 15° C. The results were shown in Tables 1 to 4.

Comparative Example 1

Heat conductivity of the similar molded article of EEA resin not containing the filler was measured by following the same procedure as that of the above Examples. The results were shown in Tables 3 and 4.

Comparative Example 2

Heat conductivity was measured by following the same procedure as that of the above Examples concerning ZINC OXIDE SUPERFINE (manufactured by Sakai Chemical Industry, Ltd., median size (D50) 0.2 μm). The results were shown in Tables 3 and 4.

Comparative Example 3

Figure 23:
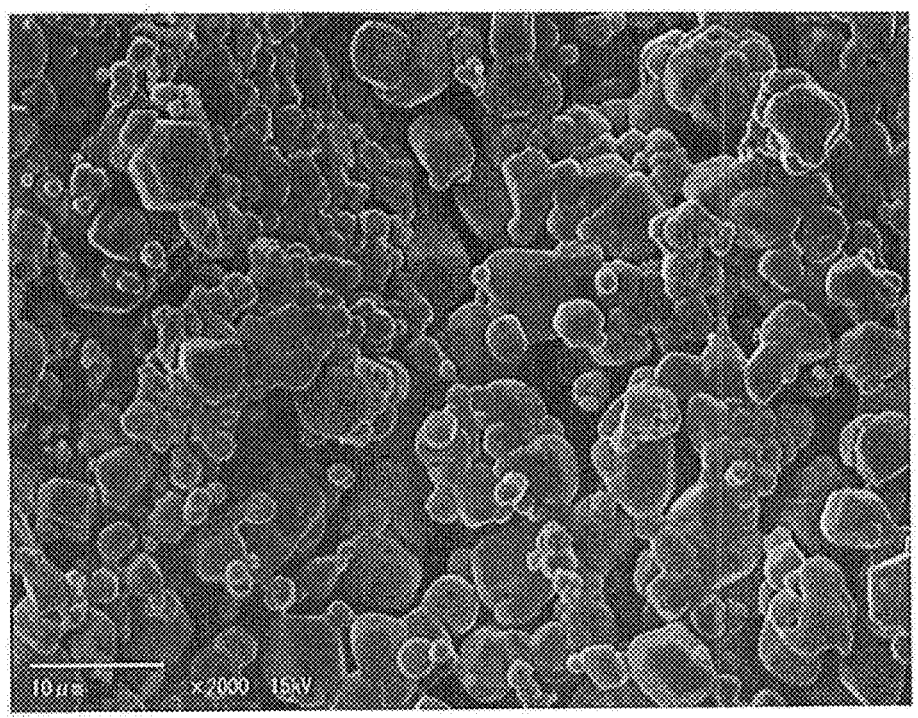
FIG. 23 is a scanning electron microscope photograph of zinc oxide particles of the present disclosure obtained in Comparative Example 3.

ZINC OXIDE SUPERFINE (manufactured by Sakai Chemical Industry, Ltd., median size (D50) 0.2 μm) 600 g was re-pulped into water to prepare a slurry with concentration of 1200 g/l. Next, this slurry was spray dried by using TYPE DCR LABO SPRAY DRYER (manufactured by Sakamoto Giken, Ltd.) to obtain granulated particles. These particles were put in a pot made of mullite or mullite/cordierite and static baked at 1000° C. for 3 hours. After cooling and dispersing into water 1.0 liter, this slurry was screened through a sieve of 200 mesh (opening of screen 75 μm). The slurry passing through the mesh was filtered and dried to obtain zinc oxide particles having median size (D50) of 13.3 μm. The size and shape of the obtained zinc oxide particle were observed by Scanning Electron Microscope JSM-5400 (manufactured by JEOL, Ltd.). The obtained electron microscope photograph was shown in FIG. 23.

Comparative Example 4

ZINC OXIDE NO. 1 (manufactured by Sakai Chemical Industry, Ltd., median size (D50) 0.6 μm) 1200 g and ammonium bromide 12 g (1.00 weight % relative to the weight of ZINC OXIDE No. 1) were mixed for 30 seconds, and the obtained mixed powder was charged in a pot made of mullite or mullite/cordierite followed by baking at 1150° C. for 3 hours.

Figure 24:
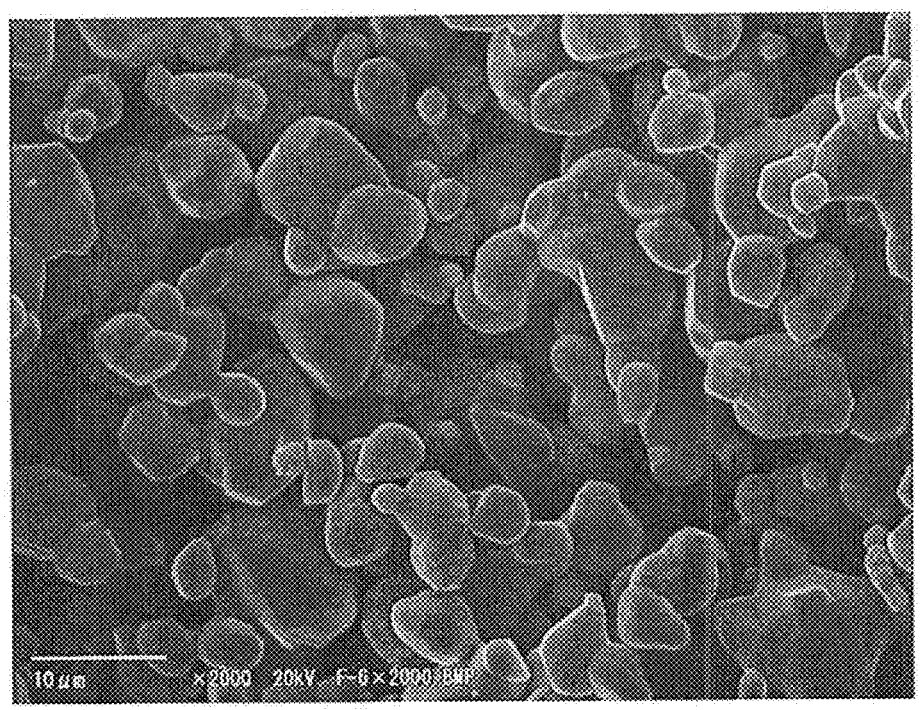
FIG. 24 is a scanning electron microscope photograph of zinc oxide particles of the present disclosure obtained in Comparative Example 4.

After cooling and dispersing into water 3.5 liter, this slurry was screened through a sieve of 200 mesh (opening of screen 75 μm). The slurry passing through the mesh was filtered and dried to obtain pseudosphere-shaped zinc oxide particles having median size (D50) of 10.2 μm. The size and shape of the obtained zinc oxide particle were observed by Scanning Electron Microscope JSM-5400 (manufactured by JEOL, Ltd.). The obtained electron microscope photograph was shown in FIG. 24. Heat conductivity was measured by following the same procedure as that of the above Examples. The results were shown in Tables 3 and 4.

Comparative Example 5

Figure 25:
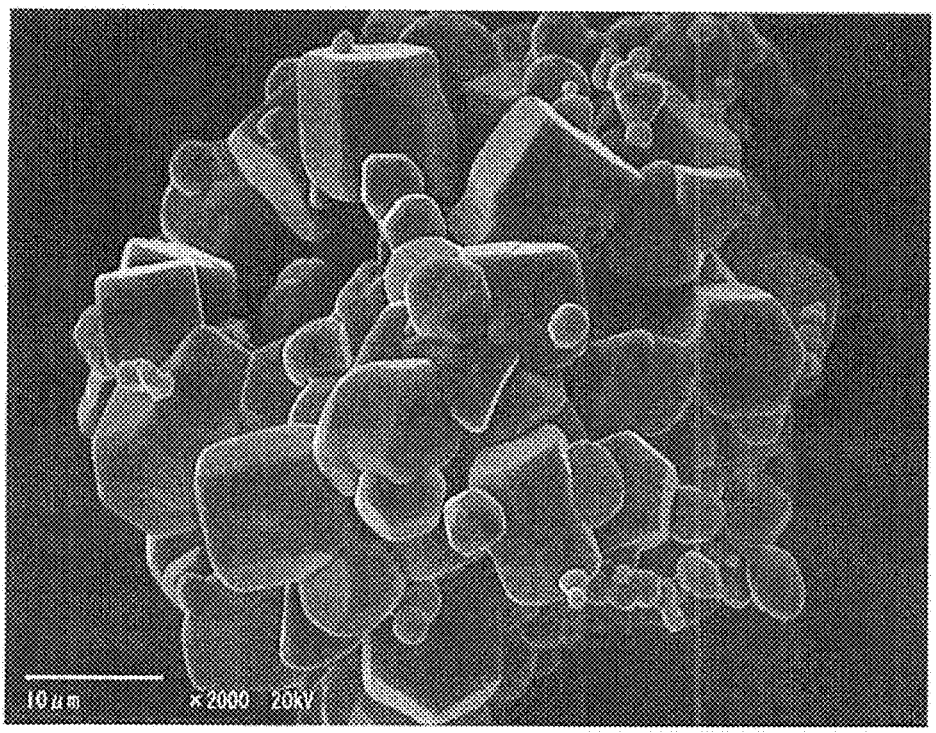
FIG. 25 is a scanning electron microscope photograph of zinc oxide particles of the present disclosure obtained in Comparative Example 5.

ZINC OXIDE SUPERFINE (manufactured by Sakai Chemical Industry, Ltd., median size (D50) 0.2 μm) 600 g was re-pulped into water, dispersant (manufactured by KAO, Ltd., POIZ532A) 3.50 weight % relative to the weight of the ZINC OXIDE SUPERFINE were added to the aqueous solution, and ammonium bromide 1.00 weight % were added to prepare a slurry with concentration of 840 g/l. Next, this slurry was spray dried by using TYPE DCR LABO SPRAY DRYER (manufactured by Sakamoto Giken, Ltd.) to obtain granulated particles. These particles were put in a pot made of mullite or mullite/cordierite and static baked at 1000° C. for 3 hours. After cooling and dispersing into water 1.0 liter, this slurry was screened through a sieve of 200 mesh (opening of screen 75 μm). The slurry passing through the mesh was filtered and dried to obtain zinc oxide particles having median size (D50) of 14.4 μm. The size and shape of the obtained zinc oxide particle were observed by Scanning Electron Microscope JSM-5400 (manufactured by JEOL, Ltd.). The obtained electron microscope photograph was shown in FIG. 25. Heat conductivity was measured by following the same procedure as that of the above Examples. The results were shown in Tables 3 and 4.

Comparative Example 6

Figure 26:
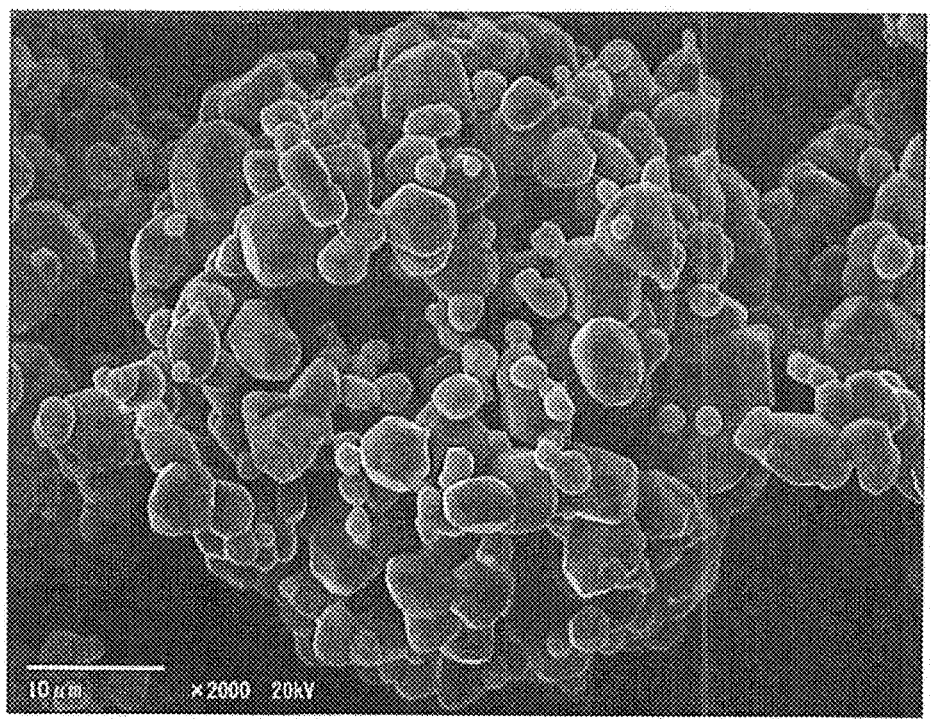
FIG. 26 is a scanning electron microscope photograph of zinc oxide particles of the present disclosure obtained in comparative Example 6.

ZINC OXIDE SUPERFINE (manufactured by Sakai Chemical Industry, Ltd., median size (D50) 0.2 μm) 600 g was re-pulped into water, dispersant (manufactured by KAO, Ltd., POIZ532A) 3.50 weight % relative to the weight of the ZINC OXIDE SUPERFINE were added to the aqueous solution, and hydrochloric acid 0.37 weight % was added to prepare a slurry with concentration of 580 g/l. Next, this slurry was spray dried by using TYPE DCR LABO SPRAY DRYER (manufactured by Sakamoto Giken, Ltd.) to obtain granulated particles. These particles were put in a pot made of mullite or mullite/cordierite and static baked at 1000° C. for 3 hours. After cooling and dispersing into water 1.0 liter, this slurry was screened through a sieve of 200 mesh (opening of screen 75 μm). The slurry passing through the mesh was filtered and dried to obtain zinc oxide particles having median size (D50) of 13.2 μm. The size and shape of the obtained zinc oxide particle were observed by Scanning Electron Microscope JSM-5400 (manufactured by JEOL, Ltd.). The obtained electron microscope photograph was shown in FIG. 26. Heat conductivity was measured by following the same procedure as that of the above Examples. The results were shown in Tables 3 and 4.

Comparative Examples 7 and 8

Figure 27:
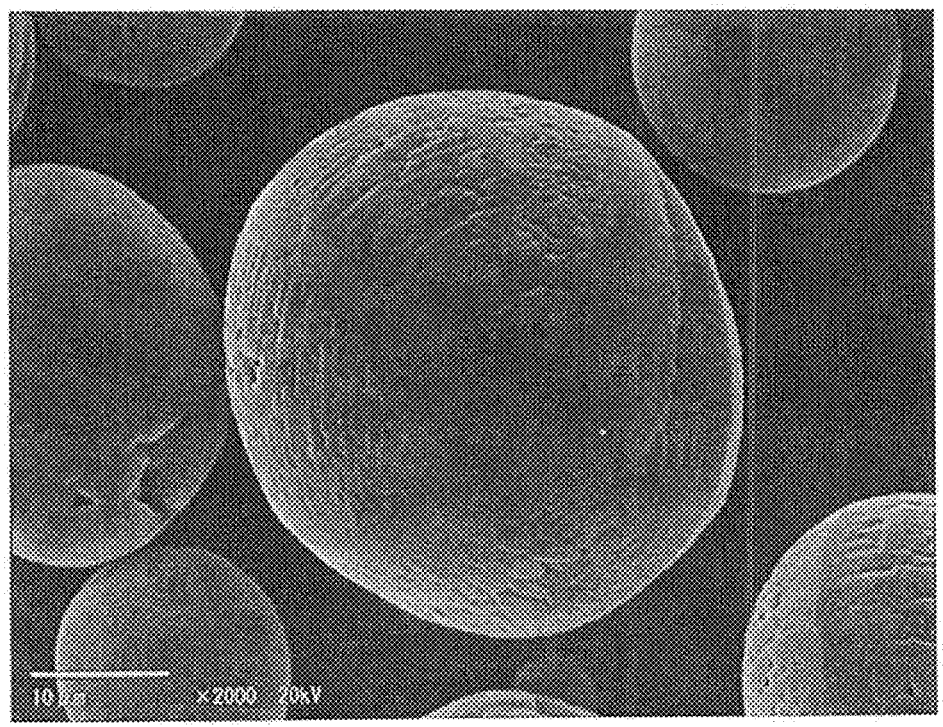
FIG. 27 is a scanning electron microscope photograph of Alumina in Comparative Example 7.
Figure 28:
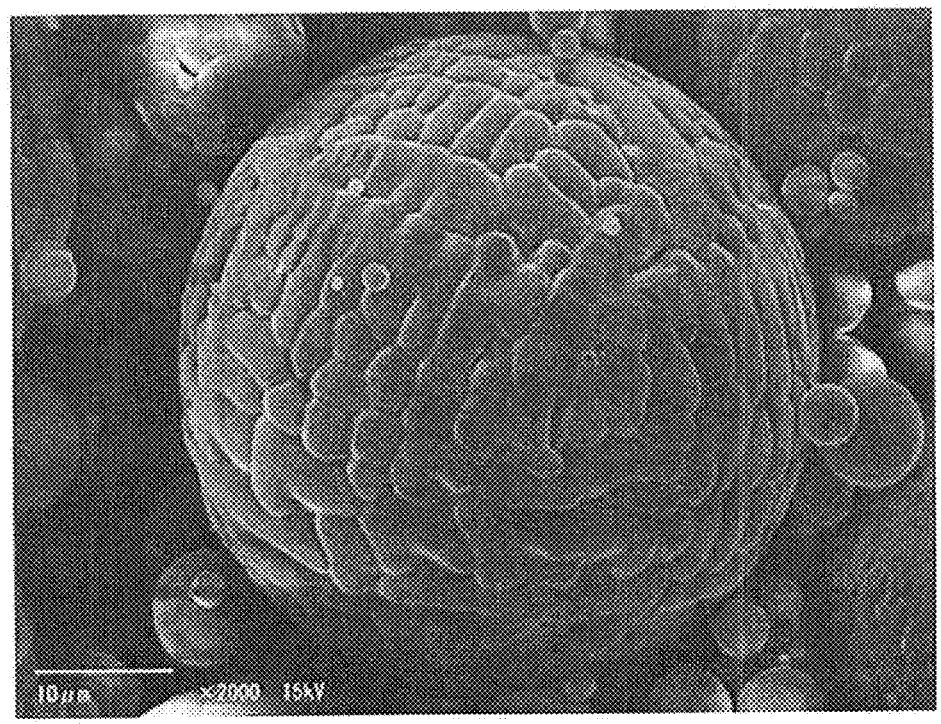
FIG. 28 is a scanning electron microscope photograph of Alumina in Comparative Example 8.

Physicality of alumina particle as an exoergic material, having physicality as shown in Table 3, was evaluated by following the same procedure as that of the above Examples. The results were shown in Tables 3 and 4. Further, the electron microscope photographs were shown in FIGS. 27 and 28.

Comparative Example 9

Figure 29:
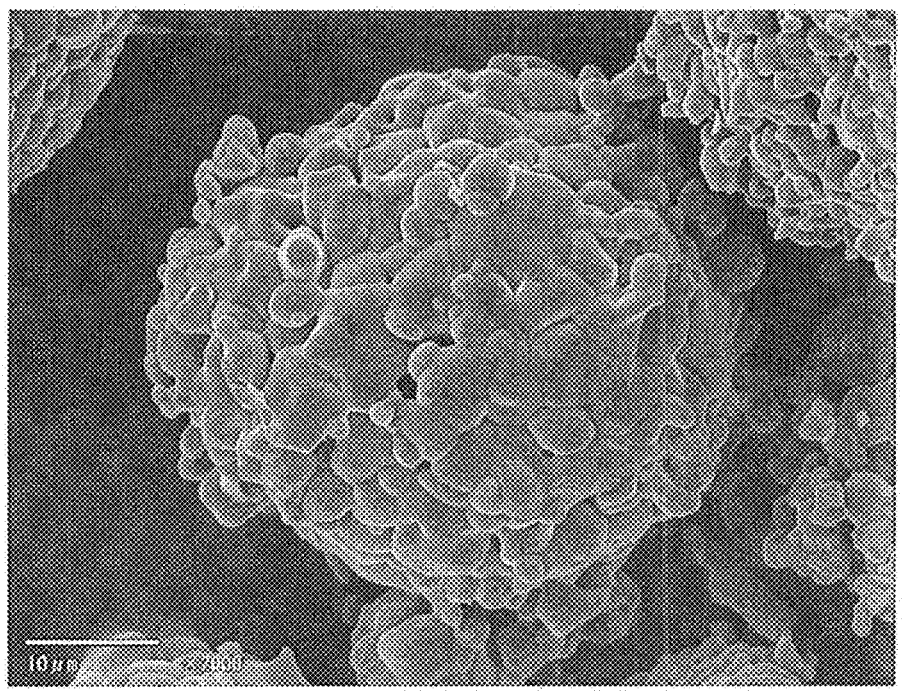
FIG. 29 is a scanning electron microscope photograph of zinc oxide particles obtained in Comparative Example 9.
Figure 30:
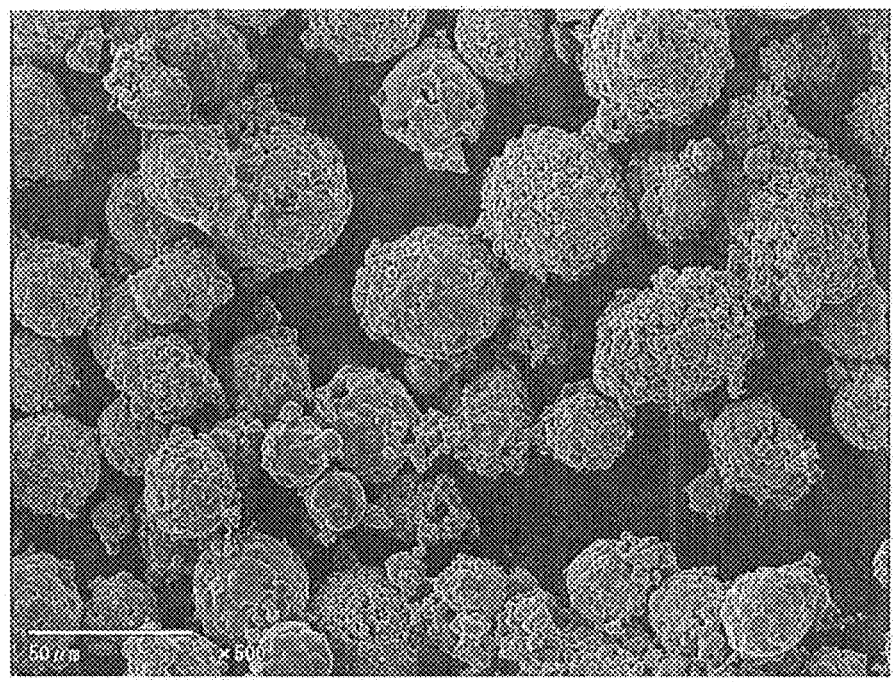
FIG. 30 is a scanning electron microscope photograph of zinc oxide particles of the present disclosure obtained in Comparative Example 9 at different magnification from FIG. 29.

Oxides including ZnO 93.9 mol %, $Bi_2O_3$ 0.10 mol %, $Co_2O_3$ 1.00 mol %, MnO 1.00 mol %, $Sb_2O_3$ 2.00 mol %, NiO 2.00 mol %, $Al^{3+}$ 0.005 mol % were added to a slurry of zinc oxide particle being ZINC OXIDE No. 1 (manufactured by Sakai Chemical Industry, Ltd., median size (D50) 0.6 μm). This slurry was spray dried by using TYPE DCR LABO SPRAY DRYER (manufactured by Sakamoto Giken, Ltd.) to obtain granulated particles. The obtained granulated particles were baked at 1200° C. to obtain zinc oxide particles of Comparative Example 9. The electron microscope photographs of the obtained particles were shown in FIGS. 29 and 30.

As the zinc oxide particles of Comparative Example 9, the apparent density was 1.94 g/ml and tap bulk density was 2.74 g/cm$^3$. The result shows it is obvious that high-density particle was not obtained. Further, it is shown that many particles having many voids, having low sphericity about the shape, and not being spherical are contained as evidenced by FIGS. 29 and 30. In addition, the aspect ratio of zinc oxide particle of Comparative Example 9 was 1.40. The ratio of particles having the aspect ratio of 1.10 or less was 6%. These evaluation results were shown in Table 3.

TABLE 1

| Example | 1 | 2 | 3 | 4 |
|---|---|---|---|---|
| Added reagent(component ①/ component ②) | Acetic acid/- | Zinc nitrate hexahiydrate/- | Oxalic acid/- | Citric acid/- |
| Addition amount of component ① | 0.61 weight part relative to zinc oxide | 3.04 weight parts relative to zinc oxide | 0.97 weight part relative to zinc oxide | 1.96 weight parts relative to zinc oxide |
| Addition amount of component ② | — | — | — | — |
| Addition amount of dispersant (POIZ 532A) | 3.50 weight parts relative to zinc oxide | 3.00 weight parts relative to zinc oxide | 3.50 weight parts relative to zinc oxide | 3.50 weight parts relative to zinc oxide |
| Concentration of slurry (g/l) | 600 | 480 | 1330 | 790 |
| Baking temperature/baking time | 1200° C./3 Hr | 1200° C./3 Hr | 1000° C./3 Hr | 1000° C./3 Hr |
| Median size D50 (μm) | 28.5 | 35.2 | 34.3 | 32.4 |
| D10 (μm) | 17.7 | 21.9 | 21.2 | 20.7 |
| D90 (μm) | 47.4 | 57.1 | 56.0 | 51.5 |
| D90/D10 | 2.7 | 2.6 | 2.6 | 2.5 |
| Aspect ratio | 1.02 | 1.05 | 1.08 | 1.08 |
| Ratio of particles having aspect ratio of 1.10 or less in 250 particles (%) | 96 | 93 | 94 | 93 |
| Density (g/cm³) | 4.78 | 4.75 | 4.64 | 4.58 |
| Apparent density (g/ml) | 2.81 | 2.74 | 2.77 | 2.76 |
| Tap bulk density (g/cm³) | 3.50 | 3.30 | 3.38 | 3.39 |
| Filling rate of filler ① (volume %) | 62.9 | 62.9 | 62.9 | 62.9 |
| Heat conductivity ① (W/m · K) | 3.2 | 3.1 | 3.2 | 3.2 |
| Specific volume resistance value ① (Ω · cm) | $1.1 \times 10^{10}$ | $5.5 \times 10^{9}$ | $2.7 \times 10^{8}$ | $9.4 \times 10^{8}$ |
| Filling rate of filler ② (volume %) | 68.8 | — | — | — |
| Heat conductivity ② (W/m · K) | 9.5 | — | — | — |
| Specific volume resistance value ② (Ω · cm) | $3.8 \times 10^{9}$ | — | — | — |

| Example | 5 | 6 | 7 | 8 | 9 |
|---|---|---|---|---|---|
| Added reagent(component ①/ component ②) | Hydrogen peroxide/- | Nitric acid/- | Acetic acid/- | Magnesium nitrate hexahydrate/- | Lithium hydroxide monohydrate/- |
| Addition amount of component ① | 0.35 weight part relative to zinc oxide | 0.84 weight part relative to zinc oxide | 0.61 weight part relative to zinc oxide | 2.70 weight parts relative to zinc oxide | 0.43 weight part relative to zinc oxide |
| Addition amount of component ② | — | — | — | — | — |
| Addition amount of dispersant (POIZ 532A) | 3.50 weight parts relative to zinc oxide | — | — | 3.50 weight parts relative to zinc oxide | 3.50 weight parts relative to zinc oxide |
| Concentration of slurry (g/l) | 1000 | 180 | — | 500 | 1360 |
| Baking temperature/baking time | 1000° C./3 Hr | 1000° C./3 Hr | 1000° C./3 Hr | 1200° C./3 Hr | 1000° C./3 Hr |
| Median size D50 (μm) | 31.1 | 22.6 | 223.7 | 31.3 | 23.0 |
| D10 (μm) | 18.6 | 14.6 | — | 18.9 | 13.7 |
| D90 (μm) | 51.0 | 36.7 | — | 49.8 | 38.3 |
| D90/D10 | 2.7 | 2.5 | — | 2.6 | 2.8 |
| Aspect ratio | 1.07 | 1.05 | 1.35 | 1.06 | 1.10 |
| Ratio of particles having aspect ratio of 1.10 or less in 250 particles (%) | 92 | 95 | 12 | 94 | 92 |
| Density (g/cm³) | 4.61 | 4.65 | 4.65 | 5.18 | 4.80 |
| Apparent density (g/ml) | 2.73 | 2.59 | 2.10 | 276 | 2.83 |
| Tap bulk density (g/cm³) | 3.26 | 3.19 | 2.93 | 3.39 | 3.44 |
| filling rate of filler ① (volume %) | — | 62.9 | 62.9 | — | — |
| Heat conductivity ① (W/m · K) | — | 3.0 | 4.6 | — | — |
| Specific volume resistance value ① (Ω · cm) | — | $8.3 \times 10^{8}$ | $2.9 \times 10^{11}$ | — | — |
| Filling rate of filler ② (volume %) | — | — | — | — | — |
| Heat conductivity ② (W/m · K) | — | — | — | — | — |
| Specific volume resistance value ② (Ω · cm) | — | — | — | — | — |

TABLE 2

| Example | 10 | 11 | 12 | 13 | 14 |
|---|---|---|---|---|---|
| Added reagent(component ①/ component ②) | Acetic acid/- lithium acetate | Acetic acid/ copper acetate (I) | Magnesium acetate tetrahydrate/- | Magnesium acetate tetrahydrate/- | Acetic acid/ nickel acetate tetrahydrate |
| Addition amount of component ① | 0.61 weight part relative to zinc oxide | 0.61 weight part relative to zinc oxide | 26.9 weight parts relative to zinc oxide | 53.7 weight parts relative to zinc oxide | 0.61 weight part relative to zinc oxide |

TABLE 2-continued

| | | | | | |
|---|---|---|---|---|---|
| Addition amount of component ② | 0.50 weight part relative to zinc oxide | 0.50 weight part relative to zinc oxide | — | — | 17.0 weight parts relative to zinc oxide |
| Addition amount of dispersant (POIZ 532A) | 3.50 weight parts relative to zinc oxide | 3.00 weight parts relative to zinc oxide | 3.50 weight parts relative to zinc oxide | 3.50 weight parts relative to zinc oxide | — |
| Concentration of slurry (g/l) | 500 | 480 | 590 | 590 | 330 |
| Baking temperature/baking time | 1000° C./3 Hr | 1150° C./3 Hr | 1200° C./3 Hr | 1200° C./3 Hr | 1200° C./3 Hr |
| Median size D50 (μm) | 31.9 | 32.5 | 29.0 | 27.3 | 33.3 |
| D10 (μm) | 20.5 | 19.8 | 19.0 | 17.7 | 21.9 |
| D90 (μm) | 50.6 | 53.0 | 45.3 | 42.5 | 52.2 |
| D90/D10 | 2.5 | 2.7 | 2.4 | 2.4 | 2.4 |
| Aspect ratio | 1.01 | 1.03 | 1.04 | 1.05 | 1.05 |
| Ratio of particles having aspect ratio of 1.10 or less in 250 particles (%) | 95 | 91 | 95 | 94 | 95 |
| Density (g/cm$^3$) | 4.85 | 4.28 | 5.05 | 5.06 | 4.61 |
| Apparent density (g/ml) | 2.88 | 2.53 | 2.55 | 2.54 | 2.59 |
| Tap bulk density (g/cm$^3$) | 3.32 | 3.24 | 3.43 | 3.20 | 3.41 |
| Filling rate of filler ① (volume %) | 62.9 | 62.9 | 63.3 | 62.9 | 62.9 |
| Heat conductivity ① (W/m·K) | 3.0 | 3.6 | 2.8 | 2.0 | 2.0 |
| Specific volume resistance value ① (Ω·cm) | $1.1 \times 10^{13}$ | $5.2 \times 10^{12}$ | $3.7 \times 10^{13}$ | $4.0 \times 10^{14}$ | $3.2 \times 10^{12}$ |
| Filling rate of filler ② (volume %) | 68.8 | 68.8 | 69.2 | 68.8 | 68.8 |
| Heat conductivity ② (W/m·K) | 5.3 | 3.9 | 4.0 | 2.3 | 2.2 |
| Specific volume resistance value ② (Ω·cm) | $3.4 \times 10^{12}$ | $1.2 \times 10^{13}$ | $2.6 \times 10^{13}$ | $2.6 \times 10^{13}$ | $2.6 \times 10^{11}$ |

| Example | 15 | 16 | 17 | 18 |
|---|---|---|---|---|
| Added reagent(component ①/ component ②) | Acetic acid/calcium acetate monohydrate | Acetic acid/-cobalt acetate tretrahydrate | Sodium acetate/- | Potassium acetate/- |
| Addition amount of component ① | 0.61 weight part relative to zinc oxide | 0.61 weight part relative to zinc oxide | 0.84 weight part relative to zinc oxide | 1.00 weight part relative to zinc oxide |
| Addition amount of component ② | 16.0 weight parts relative to zinc oxide | 10.3 weight parts relative to zinc oxide | — | — |
| Addition amount of dispersant (POIZ 532A) | — | — | 3.50 weight parts relative to zinc oxide | 3.50 weight parts relative to zinc oxide |
| Concentration of slurry (g/l) | 320 | 340 | 1380 | 1470 |
| Baking temperature/baking time | 1200° C./3 Hr | 1200° C./3 Hr | 1000° C./3 Hr | 1000° C./3 Hr |
| Median size D50 (μm) | 28.7 | 31.7 | 35.4 | 34.4 |
| D10 (μm) | 18.3 | 21.1 | 19.9 | 20.2 |
| D90 (μm) | 46.0 | 49.2 | 57.7 | 56.6 |
| D90/D10 | 2.5 | 2.3 | 2.9 | 2.8 |
| Aspect ratio | 1.03 | 1.04 | 1.05 | 1.06 |
| Ratio of particles having aspect ratio of 1.10 or less in 250 particles (%) | 95 | 95 | 96 | 96 |
| Density (g/cm$^3$) | — | 5.01 | 4.89 | 4.84 |
| Apparent density (g/ml) | 2.24 | 2.81 | 2.85 | 2.84 |
| Tap bulk density (g/cm$^3$) | 2.81 | 3.56 | 3.43 | 3.51 |
| Filling rate of filler ① (volume %) | 62.9 | 62.9 | 62.9 | 62.9 |
| Heat conductivity ① (W/m·K) | 2.3 | 3.2 | 2.5 | 3.0 |
| Specific volume resistance value ① (Ω·cm) | $3.7 \times 10^{11}$ | $2.1 \times 10^{14}$ | $1.2 \times 10^{12}$ | $5.1 \times 10^{12}$ |
| Filling rate of filler ② (volume %) | 68.8 | — | — | — |
| Heat conductivity ② (W/m·K) | 2.7 | — | — | — |
| Specific volume resistance value ② (Ω·cm) | $4.5 \times 10^{11}$ | — | — | — |

TABLE 3

| Comparative example | 1 | 2 | 3 | 4 | 5 |
|---|---|---|---|---|---|
| Added reagent(component ①/ component ②) | — | — | — | Ammonium bromide/- | Ammonium bromide/- |
| Addition amount of component ① | — | — | — | 1.00 weight part relative to zinc oxide | 1.00 weight part relative to zinc oxide |
| Addition amount of component ② | — | — | — | — | — |
| Addition amount of dispersant (POIZ 532A) | — | — | — | — | 3.50 weight parts relative to zinc oxide |
| Concentration of slurry (g/l) | — | — | 1200 | — | 840 |
| Baking temperature/baking time | — | — | 1000° C./3 Hr | 1150° C./3 Hr | 1000° C./3 Hr |
| Median size D50 (μm) | — | 0.2 | 13.3 | 10.2 | 14.4 |

TABLE 3-continued

|  |  |  |  |  |  |
|---|---|---|---|---|---|
| D10 (μm) | — | 0.1 | 5.1 | 6.1 | 6.6 |
| D90 (μm) | — | 0.5 | 47.4 | 16.8 | 27.6 |
| D90/D10 | — | 4.3 | 9.3 | 2.8 | 4.2 |
| Aspect ratio | — | — | 1.53 | 1.37 | 1.45 |
| Ratio of particles having aspect ratio of 1.10 or less in 250 particles (%) | — | — | 6 | 3 | 4 |
| Density (g/cm$^3$) | — | 4.12 | 4.80 | 4.83 | 4.81 |
| Apparent density (g/ml) | — | 0.29 | 1.07 | 1.01 | 1.03 |
| Tap bulk density (g/cm$^3$) | — | 0.52 | 2.69 | 2.64 | 2.64 |
| Filling rate of filler ① (volume %) | 0 | 62.9 | — | 62.9 | 62.9 |
| Heat conductivity ① (W/m·K) | 0.3 | 1.4 | — | 2.2 | 2.4 |
| Specific volume resistance value ① (Ω·cm) | $1.1 \times 10^{15}$ | — | — | $3.5 \times 10^{10}$ | $1.1 \times 10^{11}$ |
| Filling rate of filler ② (volume %) | — | — | — | 65.7 | — |
| Heat conductivity ② (W/m·K) | — | — | — | 2.7 | — |
| Specific volume resistance value ② (Ω·cm) | — | — | — | $1.3 \times 10^{10}$ | — |

| Comparative example | 6 | 7 | 8 | 9 |
|---|---|---|---|---|
| Added reagent(component ①/component ②) | Hydrochlorio acid/- | — | — | — |
| Addition amount of component ① | 0.37 weight part relative to zinc oxide | — | — | — |
| Addition amount of component ② | — | — | — | — |
| Addition amount of dispersant (POIZ 532A) | 3.50 weight parts relative to zinc oxide | — | — | — |
| Concentration of slurry (g/l) | 580 | — | — | — |
| Baking temperature/baking time | 1000° C./3 Hr | — | — | — |
| Median size D50 (μm) | 13.2 | 28.4 | 33.5 | — |
| D10 (μm) | 7.0 | 20.2 | 18.1 | — |
| D90 (μm) | 23.1 | 42.0 | 57.0 | — |
| D90/D10 | 3.3 | 2.1 | 3.1 | — |
| Aspect ratio | 1.39 | 1.07 | 1.05 | 1.40 |
| Ratio of particles having aspect ratio of 1.10 or less in 250 particles (%) | 8 | 94 | 92 | 6 |
| Density (g/cm$^3$) | 4.80 | — | — | — |
| Apparent density (g/ml) | 0.83 | 2.10 | 2.16 | 1.94 |
| Tap bulk density (g/cm$^3$) | 2.50 | 2.51 | 2.67 | 2.74 |
| Filling rate of filler ① (volume %) | 62.9 | 62.9 | 62.9 | — |
| Heat conductivity ① (W/m·K) | 2.5 | 1.7 | 2.3 | — |
| Specific volume resistance value ① (Ω·cm) | $5.8 \times 10^{10}$ | $1.6 \times 10^{14}$ | $3.6 \times 10^{14}$ | — |
| Filling rate of filler ② (volume %) | — | 68.8 | 68.8 | — |
| Heat conductivity ② (W/m·K) | — | 1.1 | 2.4 | — |
| Specific volume resistance value ② (Ω·cm) | — | $4.2 \times 10^{14}$ | $1.8 \times 10^{15}$ | — |

TABLE 4

|  |  | Compar. Ex. 1 | Ex. 1 | Ex. 1 | Ex. 7 | Ex. 10 | Ex. 10 | Ex. 12 | Ex. 12 |
|---|---|---|---|---|---|---|---|---|---|
| Mixing amount (g) | EEA resin | 42.3 | 16.9 | 16.9 | 16.9 | 16.9 | 16.9 | | |
| | Zinc oxide particle of Example 1 | | 168.0 | 218.4 | | | | | |
| | Zinc oxide particle of Example 7 | | | | 168.0 | | | | |
| | Zinc oxide particle of Example 10 | | | | | 168.0 | 218.4 | | |
| | Zinc oxide particle of Example 12 | | | | | | | 168.0 | 218.4 |
| | Zinc oxide particle of Comparative example 2 | | | | | | | | |
| | Zinc oxide particle of Comparative example 4 | | | | | | | | |
| | Alumina of Comparative example 7 | | | | | | | | |
| | Alumina of Comparative example 8 | | | | | | | | |
| | Filling rate of filler (volume %) | 0.0 | 62.9 | 68.8 | 62.9 | 62.9 | 68.8 | 63.3 | 69.2 |
| | Heat conductivity (W/m·K) | 0.3 | 3.3 | 9.5 | 4.6 | 3.0 | 5.3 | 2.8 | 4.0 |
| | Specific volume resistance value (Ω·cm) | $6.5 \times 10^{15}$ | $1.1 \times 10^{10}$ | $3.8 \times 10^{9}$ | $20 \times 10^{11}$ | $1.1 \times 10^{13}$ | $3.4 \times 10^{12}$ | $3.7 \times 10^{13}$ | $2.6 \times 10^{13}$ |

TABLE 4-continued

| | | Compar. Ex. 2 | Compar. Ex. 4 | Compar. Ex. 4 | Compar. Ex. 7 | Compar. Ex. 7 | Compar. Ex. 8 | Compar. Ex. 8 |
|---|---|---|---|---|---|---|---|---|
| Mixing amount (g) | EEA resin | 16.9 | 16.9 | 16.9 | 16.9 | 16.9 | 16.9 | 16.9 |
| | Zinc oxide particle of Example 1 | | | | | | | |
| | Zinc oxide particle of Example 7 | | | | | | | |
| | Zinc oxide particle of Example 10 | | | | | | | |
| | Zinc oxide particle of Example 12 | | | | | | | |
| | Zinc oxide particle of Comparative example 2 | 168.0 | | | | | | |
| | Zinc oxide particle of Comparative example 4 | | 168.0 | 198.8 | | | | |
| | Alumina of Comparative example 7 | | | | 115.0 | 149.6 | | |
| | Alumina of Comparative example 8 | | | | | | 115.0 | 149.6 |
| | Filling rate of filler (volume %) | 62.9 | 62.9 | 66.7 | 62.9 | 68.8 | 62.9 | 68.8 |
| | Heat conductivity (W/m·K) | 1.4 | 2.2 | 2.7 | 1.7 | 1.1 | 2.3 | 2.4 |
| | Specific volume resistance value (Ω·cm) | | $3.5 \times 10^{10}$ | $1.3 \times 10^{10}$ | $1.6 \times 10^{14}$ | $4.2 \times 10^{14}$ | $3.6 \times 10^{14}$ | $1.8 \times 10^{15}$ |

As shown in Table 4, heat conductivity: 9.5 (W/m·K) was extremely increased by filling up the zinc oxide particle of Example 1 in high volume % (68.8 volume %). This was derived from the fact that the zinc oxide particle of Example 1 was large particles being spherical and high-density and having median size (D50) of 28.5 μm. Therefore, such zinc oxide particle of Comparative Example 4 having a median size (D50) of 10.2 μm could not make heat conductivity as high as Example 1 because the particle size was smaller than the zinc oxide particle of Example 1 and the particle was not spherical so the filling efficiency would become worse and it could not be filled up to 68.8 volume %.

From the results shown in Table 4, it was cleared that the exoergic filler of the present disclosure had superior property than the exoergic filler used widely. It was cleared that, even if the filler was filled up densely or loosely, the exoergic property could be provided.

From the results shown in Tables 2 and 4, when salts of lithium, sodium, potassium, copper, magnesium, calcium, nickel, and cobalt are used as organic acids, organic bases, inorganic acids, inorganic bases, and salts thereof, it is obvious that the insulation property can be improved considerably with the particle diameter and other suitable property for the exoergic property maintained.

INDUSTRIAL APPLICABILITY

The zinc oxide particle of the present disclosure can be used suitably as the exoergic filler. In addition, the particle can be used for applications such as rubber accelerators, pigments for coating compositions and inks, such electronic components as ferrite and varistor, medicinal products and cosmetics.

Further, the one obtained by using salts of lithium, sodium, potassium, copper, magnesium, calcium, nickel, and cobalt as organic acids, organic bases, inorganic acids, inorganic bases, and salts thereof not containing a halogen has superior property about the insulation property, so it can be used for electronic devices. Specially, the zinc oxide particle can be used suitably as the exoergic filler for electronic devices.

The invention claimed is:

1. Zinc oxide particles being high-density, which has density of 4.0 g/cm³ or more, median size (D50) of 17 to 10000 μm and tap bulk density of 3.10 g/cm³ or more.

2. The zinc oxide particles according to claim 1, having at least 85.0 weight % purity of zinc oxide and containing, as other metals, at least one metallic element selected from the group consisting of Mg, Ca, Ni, Co, Li, Na, K and Cu of less than 15.0 weight % as oxide relative to the weight of said zinc oxide particles.

3. The zinc oxide particles according to claim 2, having the aspect ratio of 1.00 to 1.10.

4. The zinc oxide particles according to claim 2, wherein 90% or more of said particle has the aspect ratio of 1.10 or less.

5. A method for producing a zinc oxide particles, comprising a step (1) of mixing a source of the zinc oxide particles with at least one compound selected from the group consisting, of organic acids, organic bases, inorganic acids, inorganic bases, and salts thereof not containing a halogen to granulate, and a step (2) of baking the granulated particles obtained in said step (1) to obtain the zinc oxide particles according to claim 2.

6. An exoergic filler comprising the zinc oxide particles according to claim 2.

7. The zinc oxide particles according to claim 1, having the aspect ratio of 1.00 to 1.10.

8. The zinc oxide particles according to claim 3, wherein 90% or more of said particle has the aspect ratio of 1.10 or less.

9. A method for producing a zinc oxide particles, comprising a step (1) of mixing a source of the zinc oxide particles with at least one compound selected from the group consisting of organic acids, organic bases, inorganic acids, inorganic bases, and salts thereof not containing a halogen to granulate, and a step (2) of baking the granulated particles obtained in said step (I) to obtain the zinc oxide particles according to claim 7.

10. An exoergic filler comprising the zinc oxide particles according to claim 7.

11. The zinc oxide particles according to claim 1, wherein 90% or more of said particles have the aspect ratio of 1.10 or less.

12. An exoergic filler comprising the zinc oxide particles according to claim 11.

13. A method for producing a zinc oxide particles, comprising a step (1) of mixing a source of the zinc oxide particles with at least one compound selected from the group consisting of organic acids, organic bases, inorganic acids, inorganic bases, and salts thereof not containing a halogen to granulate, and a step (2) of baking the granulated particles obtained in said step (1) to obtain the zinc oxide particles according to claim 1.

14. The method for producing a zinc oxide particles according to claim 13,
wherein the organic acid, organic base, inorganic acid, inorganic base, or salt thereof is carboxylic acid, nitric acid or salts thereof.

15. The method for producing a zinc oxide particles according to claim 14, wherein the organic acid, organic base, inorganic acid, inorganic base or salt thereof is a metallic salt selected from the group consisting, of Mg, Ca, Ni, Co, Li, Na, K and Cu.

16. The method for producing a zinc oxide particles according to claim 13,
wherein the organic acid, organic base, inorganic acid, inorganic base or salt thereof is a metallic salt selected from the group consisting of Mg, Ca, Ni, Co, Li, Na, K and Cu.

17. The method for producing a zinc oxide particles according to claim 16, wherein the organic acid, organic base, inorganic acid, inorganic base or salt thereof is at least one metallic salt selected from the group consisting of Mg, Ca, Ni, Co, Li and Cu.

18. An exoergic filler comprising the zinc oxide particles according to claim 1.

19. An exoergic resin composition comprising the zinc oxide particles according to a claim 1.

20. An exoergic grease comprising the zinc oxide particles according to claim 1.

21. An exoergic coating composition comprising the zinc oxide particles according to a claim 1.

22. The zinc oxide particles according to claim 1, having D90/D10 of 3.0 or less.

* * * * *

UNITED STATES PATENT AND TRADEMARK OFFICE
CERTIFICATE OF CORRECTION

PATENT NO. : 8,399,092 B2
APPLICATION NO. : 12/767183
DATED : March 19, 2013
INVENTOR(S) : Satoru Sueda et al.

Page 1 of 1

It is certified that error appears in the above-identified patent and that said Letters Patent is hereby corrected as shown below:

In the Claims:

At column 24, claim number 8, line number 52, please amend "claim 3" to read --claim 7--.

Signed and Sealed this
Thirtieth Day of July, 2013

Teresa Stanek Rea
*Acting Director of the United States Patent and Trademark Office*